United States Patent
Oishi et al.

(10) Patent No.: US 10,668,782 B2
(45) Date of Patent: Jun. 2, 2020

(54) DRYER REGENERATION METHOD FOR AIR SUSPENSION SYSTEM

(71) Applicant: AISIN SEIKI KABUSHIKI KAISHA, Kariya-shi, Aichi-ken (JP)

(72) Inventors: Masaaki Oishi, Takahama (JP); Masakazu Ohashi, Toyota (JP); Hiroyuki Uehara, Anjo (JP); Satoshi Kimura, Anjo (JP); Taichi Mizuno, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 85 days.

(21) Appl. No.: 16/084,507

(22) PCT Filed: Mar. 16, 2017

(86) PCT No.: PCT/JP2017/010590
§ 371 (c)(1),
(2) Date: Sep. 12, 2018

(87) PCT Pub. No.: WO2017/187829
PCT Pub. Date: Nov. 2, 2017

(65) Prior Publication Data
US 2019/0084365 A1    Mar. 21, 2019

(30) Foreign Application Priority Data
Apr. 27, 2016 (JP) ................. 2016-088987

(51) Int. Cl.
*B60G 17/052* (2006.01)
*B01D 53/047* (2006.01)
*B01D 53/26* (2006.01)

(52) U.S. Cl.
CPC ......... *B60G 17/052* (2013.01); *B01D 53/047* (2013.01); *B01D 53/261* (2013.01);
(Continued)

(58) Field of Classification Search
CPC .............. B60G 17/052; B60G 17/0525; B60G 2200/10; B60G 2202/152;
(Continued)

(56) References Cited

U.S. PATENT DOCUMENTS 6,726,189 B2    4/2004  Folchert et al.
7,484,747 B2 *  2/2009  Geiger ............... B60G 17/0155
                                                280/124.157

(Continued)

FOREIGN PATENT DOCUMENTS

DE     102012200412 A1    7/2013
JP        2005074387 A    3/2005
(Continued)

OTHER PUBLICATIONS

International Search Report (PCT/ISA/210) dated Jun. 13, 2017, by the Japanese Patent Office as the International Searching Authority for International Application No. PCT/JP2017/010590.
(Continued)

*Primary Examiner* — Darlene P Condra
(74) *Attorney, Agent, or Firm* — Buchanan Ingersoll & Rooney PC

(57) ABSTRACT

An air suspension system is provided with air spring devices, a pressure accumulation tank, a compressor device that supplies compressed air at least to the pressure accumulation tank, and that includes an electric motor, a pump device, and a dryer, and a control device that performs a vehicle height increase control, a vehicle height decrease control, an air suction control, and a regeneration air discharge control. The control device performs a heat accumulation control, by actuating the pump device with the communication between the compressor device and the air spring devices being blocked, supplying the compressed air discharged through the dryer to the pump device to be
(Continued)

circulated, and accumulating heat of compression of the compressed air in the dryer, to regenerate the dryer.

11 Claims, 17 Drawing Sheets

(52) U.S. Cl.
CPC ...... *B60G 17/0525* (2013.01); *B01D 2257/80* (2013.01); *B01D 2259/40003* (2013.01); *B60G 2200/10* (2013.01); *B60G 2202/152* (2013.01); *B60G 2400/843* (2013.01); *B60G 2400/8422* (2013.01); *B60G 2500/302* (2013.01); *B60G 2600/18* (2013.01)

(58) Field of Classification Search
CPC ...... B60G 2400/8422; B60G 2400/843; B60G 2500/302; B60G 2600/18; B01D 53/047; B01D 53/261; B01D 2257/80; B01D 2259/40003

See application file for complete search history.

(56) References Cited

U.S. PATENT DOCUMENTS

| | | | | |
|---|---|---|---|---|
| 7,552,932 | B2* | 6/2009 | Matern | B60G 17/0155 280/124.16 |
| 8,490,991 | B2 | 7/2013 | Folchert et al. | |
| 2006/0049606 | A1* | 3/2006 | Geiger | B60G 17/0155 280/124.157 |
| 2010/0270760 | A1 | 10/2010 | Lloyd | |
| 2011/0278804 | A1 | 11/2011 | Folchert et al. | |
| 2012/0153711 | A1* | 6/2012 | Minato | B01D 53/0454 303/10 |
| 2015/0151603 | A1 | 6/2015 | Kondo et al. | |
| 2017/0036505 | A1* | 2/2017 | Bohn | F04B 27/005 |
| 2019/0100070 | A1* | 4/2019 | Ito | B60G 17/0525 |
| 2019/0105595 | A1* | 4/2019 | Hermans | B01D 53/0446 |
| 2019/0184333 | A1* | 6/2019 | Howe | B01D 53/261 |
| 2019/0201840 | A1* | 7/2019 | Kawai | B60G 17/015 |
| 2019/0275854 | A1* | 9/2019 | Kobayashi | B60G 17/052 |

FOREIGN PATENT DOCUMENTS

| | | |
|---|---|---|
| JP | 2010254295 A | 11/2010 |
| JP | 2012516256 A | 7/2012 |
| JP | 2012180020 A | 9/2012 |
| JP | 2015098792 A | 5/2015 |
| JP | 2015105016 A | 6/2015 |

OTHER PUBLICATIONS

Written Opinion (PCT/ISA/237) dated Jun. 13, 2017, by the Japanese Patent Office as the International Searching Authority for International Application No. PCT/JP2017/010590.

* cited by examiner

DRYER REGENERATION METHOD FOR AIR SUSPENSION SYSTEM

TECHNICAL FIELD

The present invention relates to a dryer regeneration method for an air suspension device, particularly to a dryer regeneration method for use in an air suspension device that controls supplying or discharging air to an air spring device installed on each wheel of a vehicle.

BACKGROUND ART

As for a dryer regeneration method in a so called closed air suspension system, there is disclosed a method for determining an amount of air required for regeneration based on an amount of suction air, a temperature or humidity of the suction air, in Patent document 1 as listed below, for example. Also, in Patent document 2 cited in the Patent document 1, there are disclosed various operation modes for supplying or discharging pressurized air between air chambers and a reservoir, in a vehicle level control.

PRIOR ART DOCUMENT

Patent Document

[Patent document 1] U.S. Pat. No. 8,490,991
[Patent document 2] U.S. Pat. No. 6,726,189

SUMMARY OF THE INVENTION

Problems to be Solved by the Invention

In general, as a method for improving a regeneration efficiency of a dryer for use in an air suspension device, when all or a part of air dried by a desiccant agent in the dryer is used for its regeneration, employed is a pressure swing method that regenerates the desiccant agent by passing the air through the dryer, with the air being reduced in pressure through an orifice, for example. Or, in a factory and etc., as a regeneration method performed by a dewatering device using the desiccant agent, employed is a thermal swing method that regenerates the desiccant agent by passing air of a high temperature through the dryer. Each method has been performed individually, and there has not been such a possibility that both methods are performed simultaneously, so that no combination of them has not been contemplated.

According to the closed air suspension system as described in the aforementioned documents, the air circulated within the system is used generally, so that the outside air is introduced only in case of insufficient amount of air, and a part of the amount of suction air is used for regenerating the dryer immediately after the air suction operation. Accordingly, if there remains residual moisture, the residual moisture is transferred to and adsorbed by the desiccant agent, at every time when the air is circulated in the dryer, whereby a dew point in the dryer is likely to be high. Especially in case of the closed air suspension system, therefore, it is important for the desiccant agent that a coefficient of moisture adsorption is to be low, so that a regeneration efficiency of the dryer shall be improved.

Accordingly, it is an object of the present invention to provide a dryer regeneration method for an air suspension device, by which a regeneration efficiency of the dryer can be improved, without providing a heating device and etc., separately.

Means for Solving the Problems

In order to solve the above-described problem, the present invention relates to a dryer regeneration method for an air suspension device, which comprises an air spring device provided with an air chamber and mounded on each wheel of a vehicle, a pressure accumulation tank that supplies compressed air to the air spring device, a compressor device that supplies the compressed air at least to the pressure accumulation tank, and that includes an electric motor served as a power source, a pump device driven by the electric motor to produce the compressed air, and a dryer that dries the compressed air produced by the pump device, and a control device that performs a vehicle height increase control by communicating the pressure accumulation tank with the air spring device to supply the compressed air to the air chamber, a vehicle height decrease control by communicating the air spring device with the compressor device to discharge the air in the air chamber through the compressor device, an air suction control by communicating the compressor device with the pressure accumulation tank to supply outside air to the pressure accumulation tank, and a regeneration air discharge control by communicating the pressure accumulation tank with the compressor device to discharge the air in the pressure accumulation tank to the outside through the dryer, wherein the control device performs a heat accumulation control, by driving the pump device, with the communication between the compressor device and the air spring device being blocked, supplying the compressed air discharged through the dryer to the pump device to be circulated, and accumulating heat of compression of the compressed air in the dryer, to regenerate the dryer.

In the dryer regeneration method as described above, the control device may be so constituted to perform the heat accumulation control before the regeneration air discharge control, and before or after the air suction control. And, it may be provided with a temperature sensor for detecting a temperature of the outside air supplied from the compressor device to the pressure accumulation tank, and the control device may be so constituted to determine necessity of the heat accumulation control based on at least a result detected by the temperature sensor. Furthermore, it may be provided with a humidity sensor for detecting a humidity of the outside air supplied from the compressor device to the pressure accumulation tank, and the control device may be so constituted to determine necessity of the heat accumulation control based on the results detected by the humidity sensor and temperature sensor. Also, the control device may be so constituted to adjust a performing duration of the heat accumulation control based on the results detected by the humidity sensor and temperature sensor.

In the dryer regeneration method as described above, the compressor device may comprise an atmosphere suction port that suctions the atmosphere into the pump device, a discharge port that discharges the compressed air of the pump device through the dryer, and a back pressure introduction port that introduces the air in the air chamber and the air discharged through the dryer, and the air suspension device may comprise a first flow passage that communicates the pressure accumulation tank with the air chamber, a control valve disposed in the first flow passage, and a second flow passage that communicates a position between the control valve and the pressure accumulation tank with the back pressure introduction port, and that communicates the discharge port with the pressure accumulation tank, and the control device may be so constituted to control opening and closing the control valve to control the air supplied to and discharged from the air spring device, and control opening and closing the second flow passage to perform the heat accumulation control.

Then, the air suspension device may comprise a circulation passage configured by the first flow passage and the second flow passage, to circulate the compressed air by supplying the air discharged through the dryer to the pump device, and a switching device that opens and closes the circulation passage according to the control performed by the control device. The switching device may comprise a switching valve that opens and closes the circulation passage. Furthermore, the switching device may further comprise a three-port two-position changeover valve, which is arranged in parallel with the switching valve, and disposed between the discharge port of the compressor device and the pressure accumulation tank, and which provides a first position that communicates the discharge port of the compressor device with the pressure accumulation tank, and that blocks the communication between the pressure accumulation tank and the first flow passage, and a second position that communicates the pressure accumulation tank with the first flow passage, and that blocks the communication between the discharge port of the compressor device and the pressure accumulation tank, so that the first position or the second position is selected by the control device. Or, the switching device may comprise a three-port three-position changeover valve, which is disposed between the discharge port of the compressor device and the pressure accumulation tank, and which provides a first position that communicates the discharge port of the compressor device with the first flow passage, and that blocks the communication between the discharge port of the compressor device and the pressure accumulation tank, a second position that communicates the discharge port of the compressor device with the pressure accumulation tank, and that blocks the communication between the pressure accumulation tank and the first flow passage, and a third position that communicates the pressure accumulation tank with the first flow passage, and that blocks the communication between the discharge port of the compressor device and the pressure accumulation tank, so that one of the first to third positions is selected by the control device.

Or, in the dryer regeneration method as described above, the air suspension device may comprise a first supply-discharge switching valve, which is connected to the first flow passage between the pressure accumulation tank and the control valve, and connected to the discharge port of the compressor device, a first tank switching valve which is disposed in the second flow passage between the discharge port of the compressor device and the pressure accumulation tank, and a second supply-discharge switching valve and a second tank switching valve, which are disposed in the first flow passage between the control valve and the pressure accumulation tank, and which are arranged in parallel with the first supply-discharge switching valve and the first tank switching valve, wherein a position between the second supply-discharge switching valve and the second tank switching valve is connected to the back pressure introduction port of the compressor device, and a position between the first supply-discharge switching valve and the first tank switching valve is connected to the discharge port of the compressor device, and wherein the control device controls opening and closing the first and second tank switching valves, or opening and closing the first and second supply-discharge switching valves, to perform the heat accumulation control, so that the compressed air discharged from the discharge port through the dryer is introduced into the back pressure introduction port through the second flow passage to be circulated, to accumulate the heat of compression of the compressed air in the dryer.

Effects of the Invention

As the present invention is configured as described above, the following effects are achieved. That is, according to the present invention, in the dryer regeneration method for the air suspension device comprising the air spring device, pressure accumulation tank, compressor device that supplies the compressed air at least to the pressure accumulation tank, and that includes the electric motor, pump device and dryer, and control device that performs the vehicle height increase control, vehicle height decrease control, air suction control and regeneration air discharge control, as the heat accumulation control is performed by driving the pump device, with the communication between the compressor device and the air spring device being blocked, supplying the compressed air discharged through the dryer to the pump device to be circulated, and accumulating the heat of compression of the compressed air in the dryer, to regenerate the dryer, when the dryer regeneration is performed, the regeneration efficiency of the dryer can be improved by the air of high temperature and low pressure, without providing a heating device and etc., separately.

Particularly, if the heat accumulation control is to be performed before the regeneration air discharge control, and before or after the air suction control, the dryer regeneration can be performed smoothly and appropriately. And, if the necessity of the heat accumulation control is to be determined based on the result detected by the temperature sensor for detecting the temperature of the outside air supplied from the compressor device to the pressure accumulation tank, the regeneration efficiency of the dryer can be improved easily. Furthermore, if it is provided with the humidity sensor for detecting the humidity of the outside air supplied from the compressor device to the pressure accumulation tank, and the necessity of the heat accumulation control is to be determined based on the results detected by the humidity sensor and temperature sensor, the dryer regeneration can be performed appropriately. Also, if the performing duration of the heat accumulation control is to be adjusted based on the results detected by the humidity sensor and temperature sensor, the regeneration efficiency of the dryer can be improved further, with a simple configuration.

In the dryer regeneration method as described above, if the compressor device comprises the aforementioned atmosphere suction port, discharge port and back pressure introduction port, and the air suspension device comprises the first flow passage that communicates the pressure accumulation tank with the air chamber, the control valve disposed in the first flow passage, and the second flow passage that communicates the position between the control valve and the pressure accumulation tank with the back pressure introduction port, and that communicates the discharge port with the pressure accumulation tank, and the control device is constituted to control opening and closing the control valve to control the air supplied to and discharged from the air spring device, and control opening and closing the second flow passage, to perform the heat accumulation control, when the dryer regeneration is performed, the regeneration efficiency of the dryer can be improved by the air of high temperature and low pressure, without providing the heating device and etc., separately.

And, if the air suspension device comprises the circulation passage configured by the first flow passage and the second flow passage, and the switching device that opens and closes the second flow passage according to the control performed by the control device, and the switching device is configured by the switching valve that opens and closes the circulation passage, for example, the above-described heat accumulation control can be performed, with a simple configuration. Furthermore, the three-port two-position changeover valve may be arranged in parallel with the switching valve. Especially, if the switching device is configured by the aforementioned three-port three-position changeover valve, it will be good at airtightness, so that its regeneration function will be improved, and its mobility will be improved.

Or, in the dryer regeneration method as described above, if the air suspension device comprises the first and second supply-discharge switching valves, and the first and second tank switching valves, and if the heat accumulation control is performed by opening and closing those valves, so that the compressed air discharged from the discharge port through the dryer is introduced into the back pressure introduction port through the second flow passage to be circulated, to accumulate the heat of compression of the compressed air in the dryer, then, the compressed air can be supplied to the air spring device efficiently, and the switching valves provided for the heat accumulation control can be selected appropriately, even in the case where the pressure in the pressure accumulation tank is low, so that the dryer regeneration can be performed smoothly.

EMBODIMENTS FOR CARRYING OUT THE INVENTION

Figure 1:
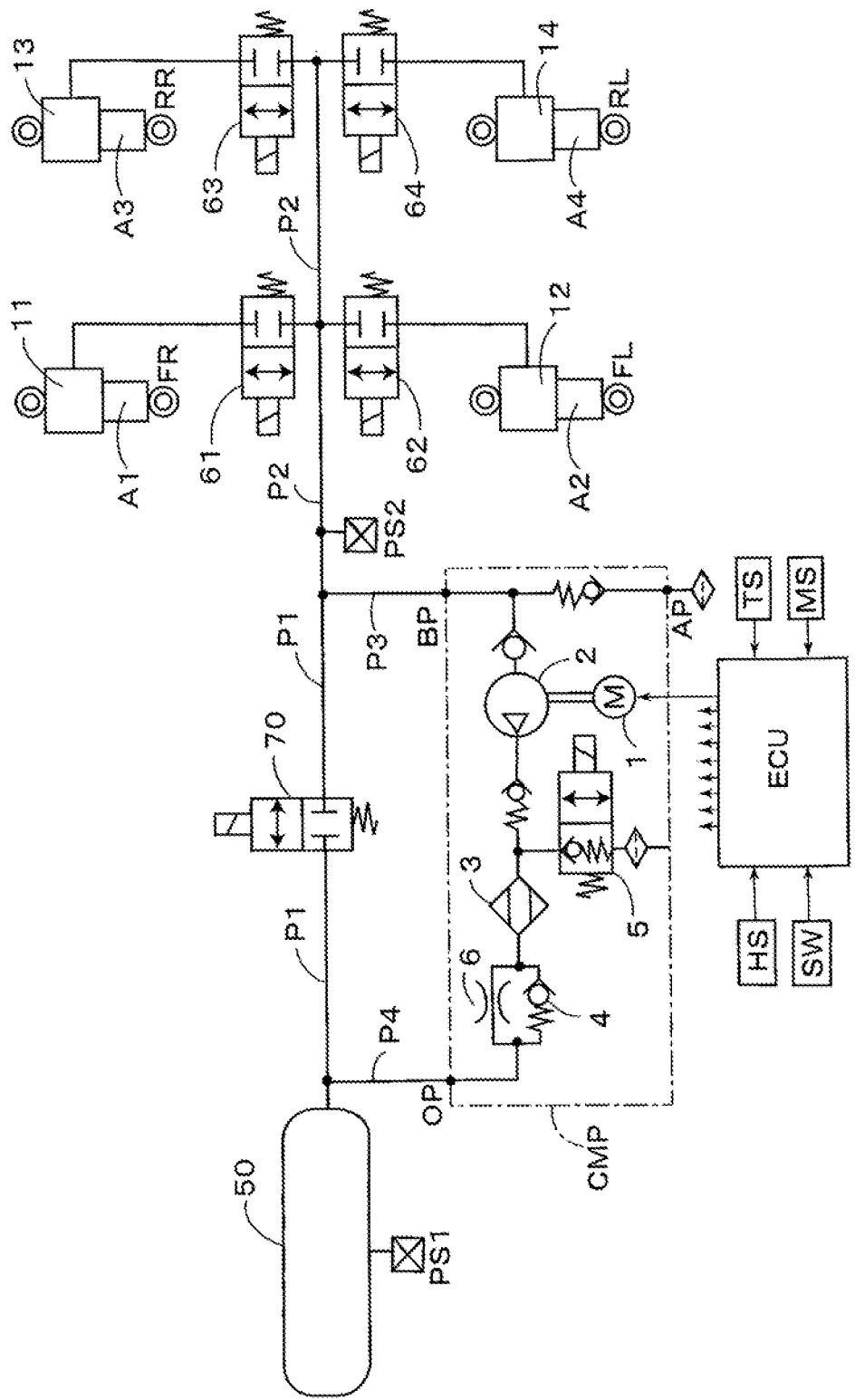
FIG. 1 is a block diagram showing a fundamental configuration of an air suspension device for use in an embodiment of the present invention.

Hereinafter, will be explained desirable embodiments of the present invention referring to drawings. At the outset, a fundamental configuration of an air suspension device of a closed type provided for an embodiment of the present invention. In FIG. 1, as a compressed air supply source in the air suspension device, a pressure accumulation tank 50 is disposed, and a compressor device CMP is configured as shown in a frame indicated by a dashed-dotted line in FIG. 1. This compressor device CMP includes an electric motor 1 served as a power source, a pump device 2 that converts a rotating motion of the electric motor 1 into a reciprocating motion of a piston in a cylinder to produce the compressed air, and a dryer 3 that dries the compressed air produced by the pump device 2 and discharges it. In its air discharge passage, there is disposed a discharge switching valve (relief valve) 5, which is configured by a normally-closed electromagnetic switching valve. Furthermore, in the compressor device CMP, a check valve 4 is arranged to allow an air flow in the discharging direction, and block its reverse flow, and in parallel with it, there is disposed an orifice 6 to be communicated always through a throttle. OP indicates a discharge port, BP indicates a back pressure introduction port, and AP indicates an atmosphere suction port.

Air spring devices A1-A4 having air chambers 11-14 are provided respectively at four wheels of a vehicle, i.e., a front-right wheel FR, a front-left wheel FL, a rear-right wheel RR, and a rear-left wheel RL, only each support portion of which is indicated in FIG. 1. The air chambers 11-14 are communicated with the pressure accumulation tank 50 through flow passages P1 and P2. A first flow passage is configured by the flow passages P1 and P2, and wheel switching valves 61-64 are disposed in the flow passage P2, to be served as control valves that control supplying and discharging the air to and from the air chambers 11-14, respectively. Furthermore, as a switching device in the present invention, there is disposed a switching valve 70 that opens or closes the flow passage P1, and a position between the switching valve 70 and the wheel switching valves 61-64, i.e., a connecting position of the flow passages P1 and P2 as shown in FIG. 1, is connected to the back pressure introduction port BP of the compressor device CMP through a flow passage P3. Then, a position between the switching valve 70 and the pressure accumulation tank 50 is connected to the discharge port OP of the compressor device CMP through a flow passage P4, and a second flow passage is configured by the flow passages P3 and P4.

According to the present embodiment, the wheel switching valves 61-64 and the switching valve 70 are configured by normally-closed electromagnetic valves, at closed positions of which relief valves are configured. The wheel switching valves 61-64 and switching valve 70 are controlled to be opened or closed, the electric motor 1 is controlled to be driven, and the air spring devices A1-A4 for the wheels are controlled, according to a control device ECU, as described later.

According to the compressor device CMP, when the pump device 2 is actuated by the electric motor 1, the dried and compressed air is discharged, through the dryer 3 and check valve 4. When the normally-closed discharge switching valve 5 is placed in its open position, with the electric motor 1 being stopped, and the air is discharged through the dryer 3 and orifice 6, a desiccant agent (not shown) in the dryer 3 is regenerated by the discharge air. Pressure sensors PS1 and PS2 are provided on the pressure accumulation tank 50 and flow passage P2, respectively, so that pressures in the pressure accumulation tank 50 and the flow passage P2 are detected by the Pressure sensors PS1 and PS2, and detected pressure signals are fed to the control device ECU. Furthermore, the compressed air, which is heated by compressing operation of the pump device 2, is discharged from the dryer 3, and introduced into the back pressure introduction port BP, through the flow passage P4, flow passage P1, switching valve 70 placed in its open position, and flow passage P3, so that the heat of compression is accumulated in the dryer 3, to provide a heat accumulation control, as described later with reference to FIG. 5.

According to the present embodiment, there are provided a temperature sensor TS that detects a temperature of the atmosphere (outside air) supplied from the atmosphere suction port AP, and a humidity sensor MS that detects a humidity of the atmosphere, so that necessity of the heat accumulation control is determined by the control device ECU, on the basis of the results detected by the humidity sensor MS and temperature sensor TS, as described later with reference to FIG. 18. In the case where such a temperature sensor as the one for detecting the outside air or the like is installed in the vehicle, it may be used instead of the temperature sensor TS. When the necessity of the heat accumulation control is determined, the humidity sensor MS may be omitted. According to the present embodiment, however, it is so constituted that such a duration that the compressed air discharged from the discharge port OP of the compressor device CMP is introduced into the back pressure introduction port BP through the flow passage P3, i.e., duration of the heat accumulation control, can be adjusted by the control device ECU, on the basis of the results detected by the humidity sensor MS and temperature sensor TS.

Herein, after a conventional vehicle height adjustment control of the air suspension device of the present embodiment is explained, a regeneration air discharge control of the dryer 3 and etc. will be explained. At the outset, in a normal case where sufficient compressed air is stored in the pressure accumulation tank 50, each switching valve is placed in its closed position as shown in FIG. 1, and the electric motor 1 is not operated, i.e., stopped state. Then, in response to a signal detected by a vehicle height sensor HS, or operation of a manual switch SW and the like, each switching valve is controlled by the control device ECU, to be opened or closed, as described hereinafter.

Figure 2:
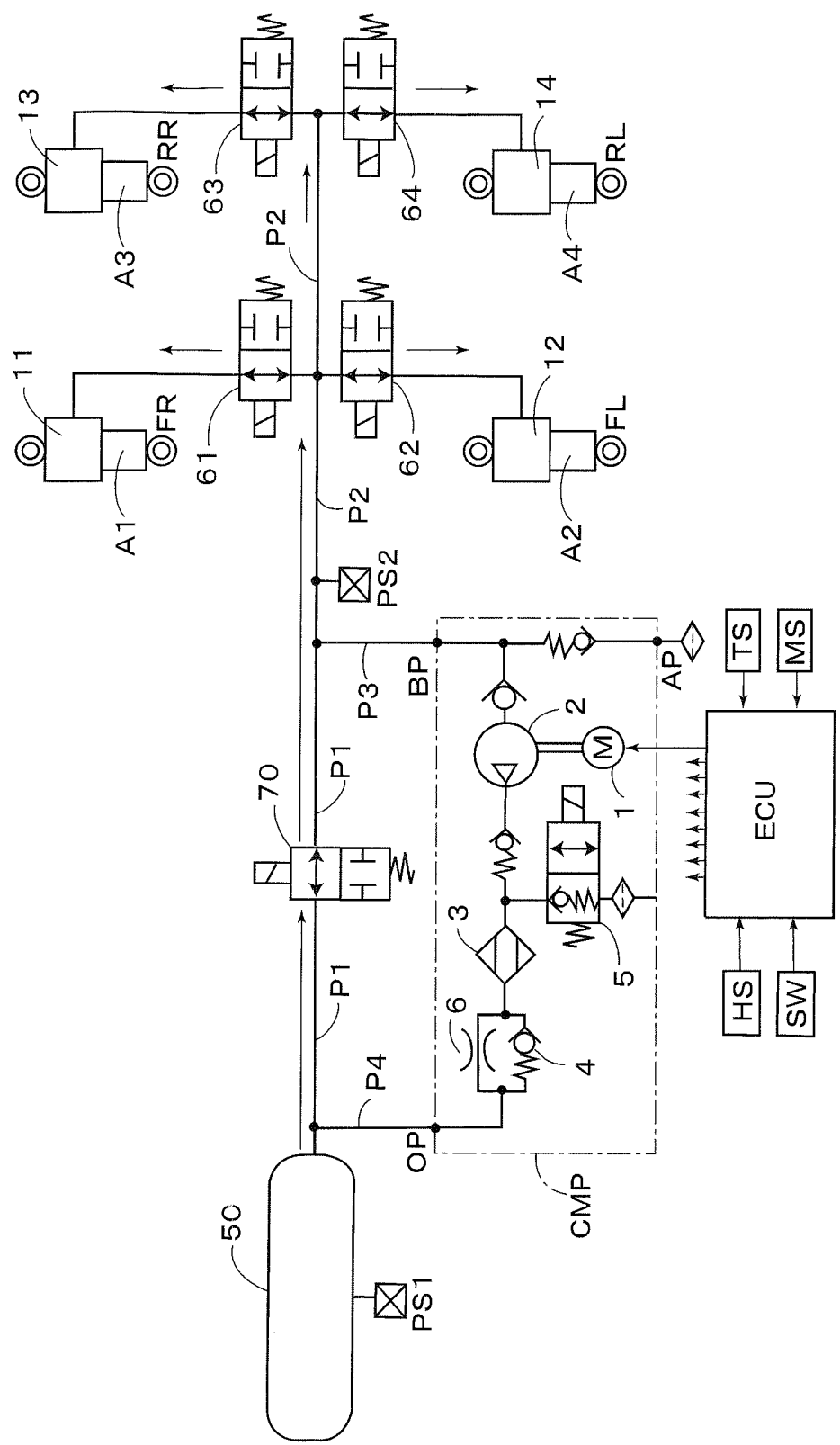
FIG. 2 is a block diagram showing a vehicle height increase control according to an embodiment of the present invention.

For example, when a vehicle height increase (raising) command is detected in the control device ECU, a vehicle height increase control is performed, as follows. That is, when the pressure detected by the pressure sensor PS1 is greater than the pressure detected by the pressure sensor PS2, and equal to or greater than a predetermined pressure "K1", the switching valve 70 and wheel switching valves 61-64 are placed in their open positions, then, the compressed air in the pressure accumulation tank 50 is supplied to the air chambers 11-14 through the flow passages P1 and P2, as indicated by thin lines in FIG. 2, so that the air chambers 11-14 are expanded to increase (raise) the vehicle height. When the vehicle height has reached a desired height, the switching valve 70 and wheel switching valves 61-64 are placed in their closed positions.

Figure 3:
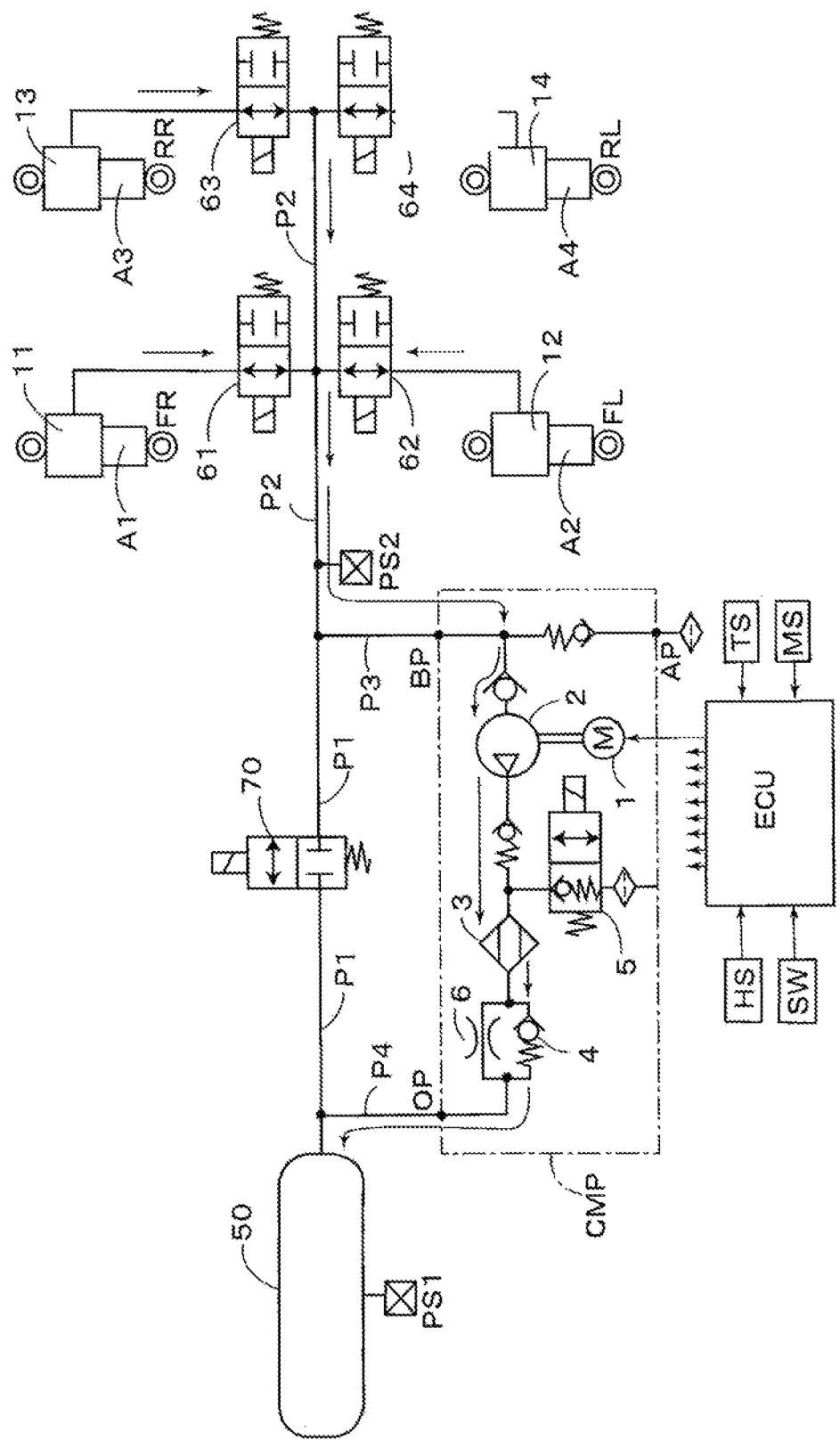
FIG. 3 is a block diagram showing a vehicle height decrease control according to an embodiment of the present invention.

On the other hand, when a vehicle height decrease (lowering) command is detected, a vehicle height lowering control is performed, as shown in FIG. 3. That is, with the switching valve 70 being placed in its closed position, wheel switching valves 61-64 are placed in their open positions, and the electric motor 1 is driven. Accordingly, the compressed air in the air chambers 11-14 is supplied into the pressure accumulation tank 50, through the flow passages P2 and P3, pump device 2, dryer 3, check valve 4 and flow passage P4, as indicated by thin lines in FIG. 3, so that the air chambers 11-14 are reduced to decrease (lower) the vehicle height, and the pressure is accumulated in the pressure accumulation tank 50. When the vehicle height has reached a desired height, the electric motor 1 is stopped, and the wheel switching valves 61-64 are placed in their closed positions.

Figure 4:
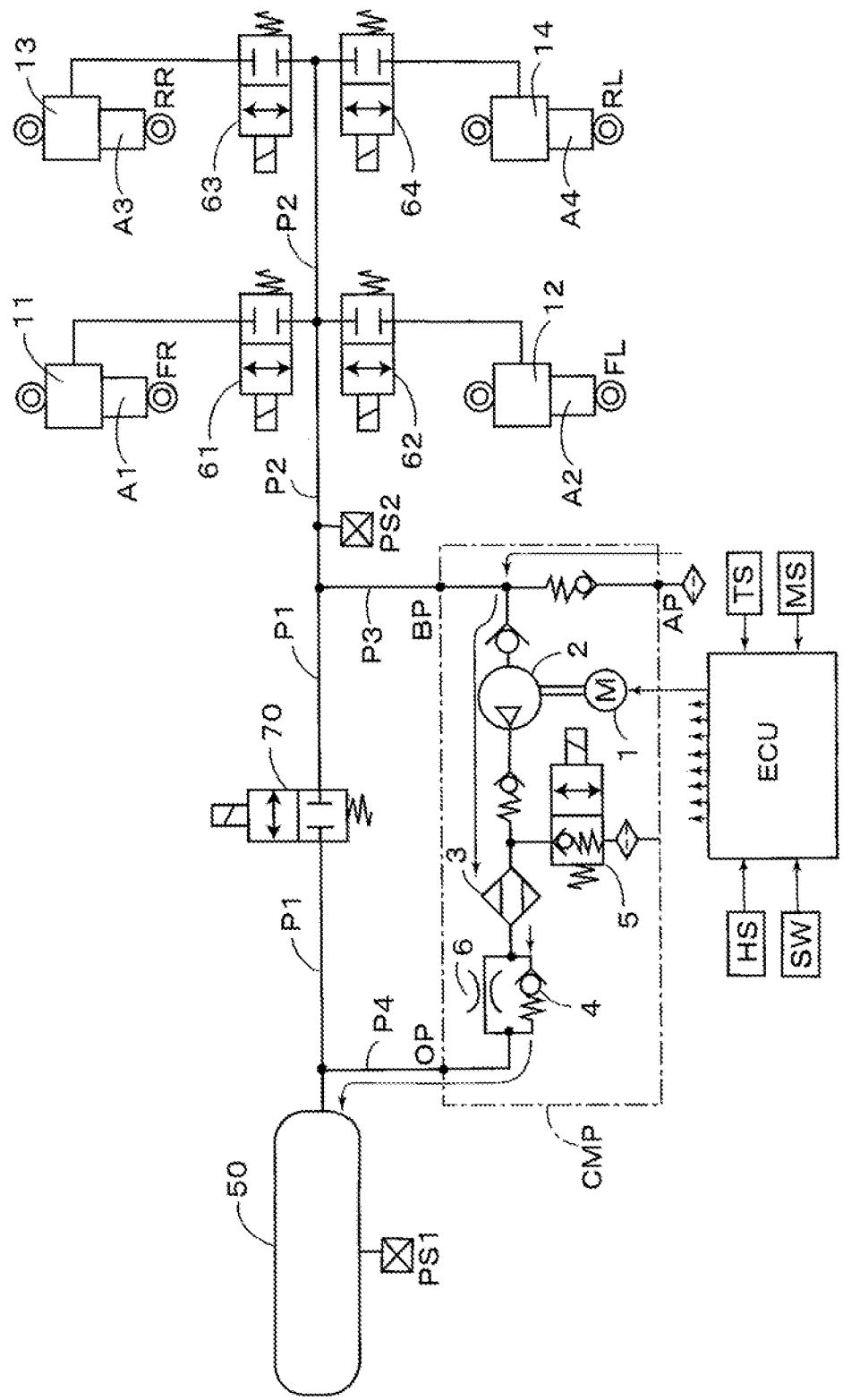
FIG. 4 is a block diagram showing an air suction control according to an embodiment of the present invention.

And, when the pressure detected by the pressure sensor PS1 is decreased to be smaller than the predetermined pressure "K1", an air suction control to the pressure accumulation tank 50 is performed. That is, as shown in FIG. 4, with the wheel switching valves 61-64, switching valve 70 and discharge switching valve 5 being placed in their closed positions, when the electric motor 1 is driven, the atmosphere is sucked from the atmosphere suction port AP, and the compressed air produced by the pump device 2 is supplied from the discharge port OP to the pressure accumulation tank 50 through the flow passage P4, as indicated by thin lines in FIG. 4. When the pressure detected by the pressure sensor PS1 is equal to or greater than a predetermined pressure "K3" (>K1), the electric motor 1 is stopped, and the pressure accumulation tank 50 is returned to its state for holding the high pressure.

Figure 5:
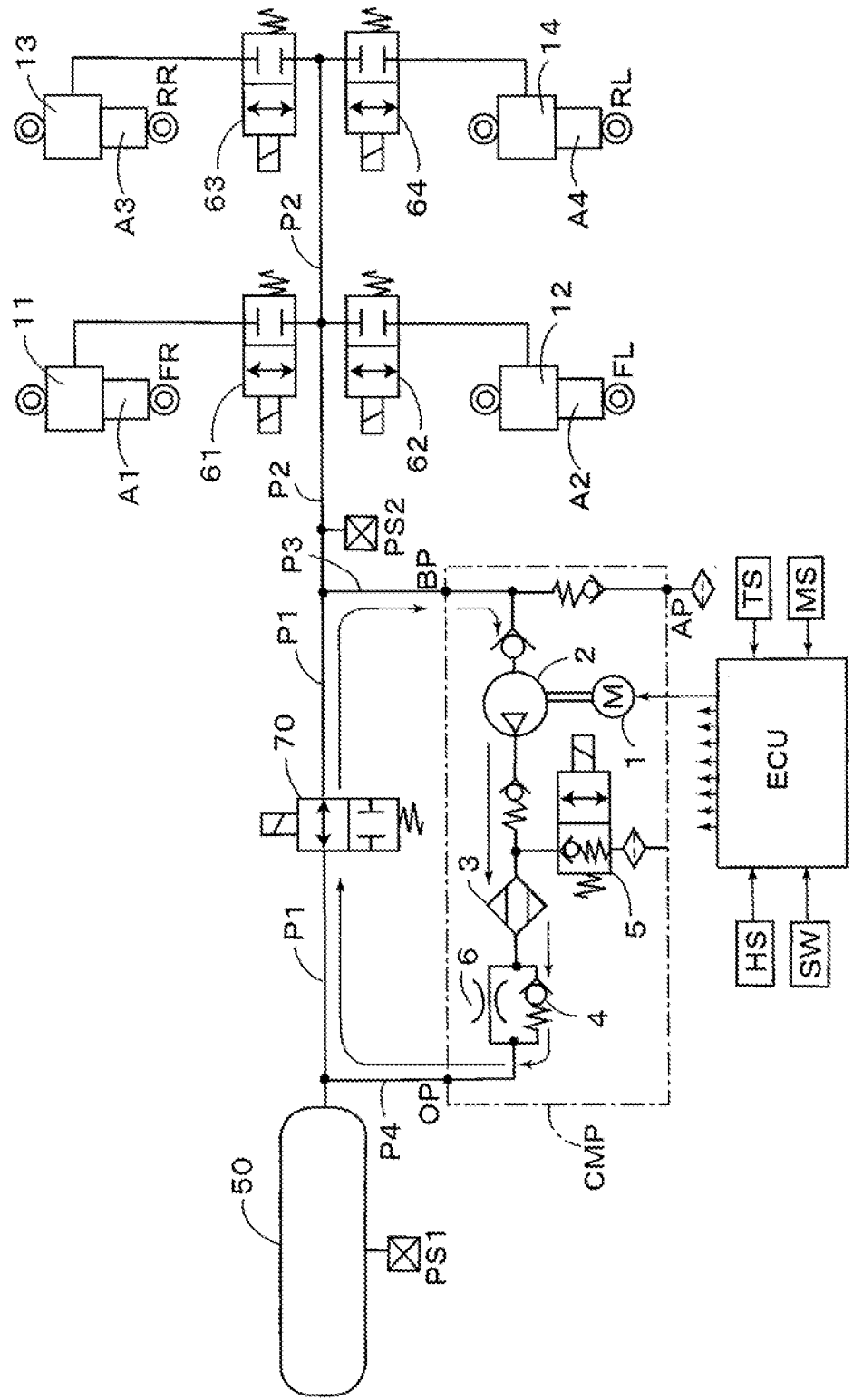
FIG. 5 is a block diagram showing a heat accumulation control according to an embodiment of the present invention.

Before or after the air suction control as described above, the necessity of the heat accumulation control is determined on the basis of the results detected by the humidity sensor MS and temperature sensor TS. When the heat accumulation control is determined to be needed, as shown in FIG. 5, with the wheel switching valves 61-64 and discharge valve 5 being placed in their closed positions, the switching valve 70 is placed in its open position by the control device ECU, so that a circulation passage is formed by the flow passages P4, P1 and P3. Accordingly, as shown in thin arrow lines in FIG. 5, the compressed air discharged from the dryer 3 is supplied from the discharge port OP into the back pressure introduction port BP, through the above-described circulation passage. During this operation, the compressed air, which is heated by compressing operation of the pump device 2, is circulated, so that the heat of compression is accumulated in the dryer 3.

Figure 6:
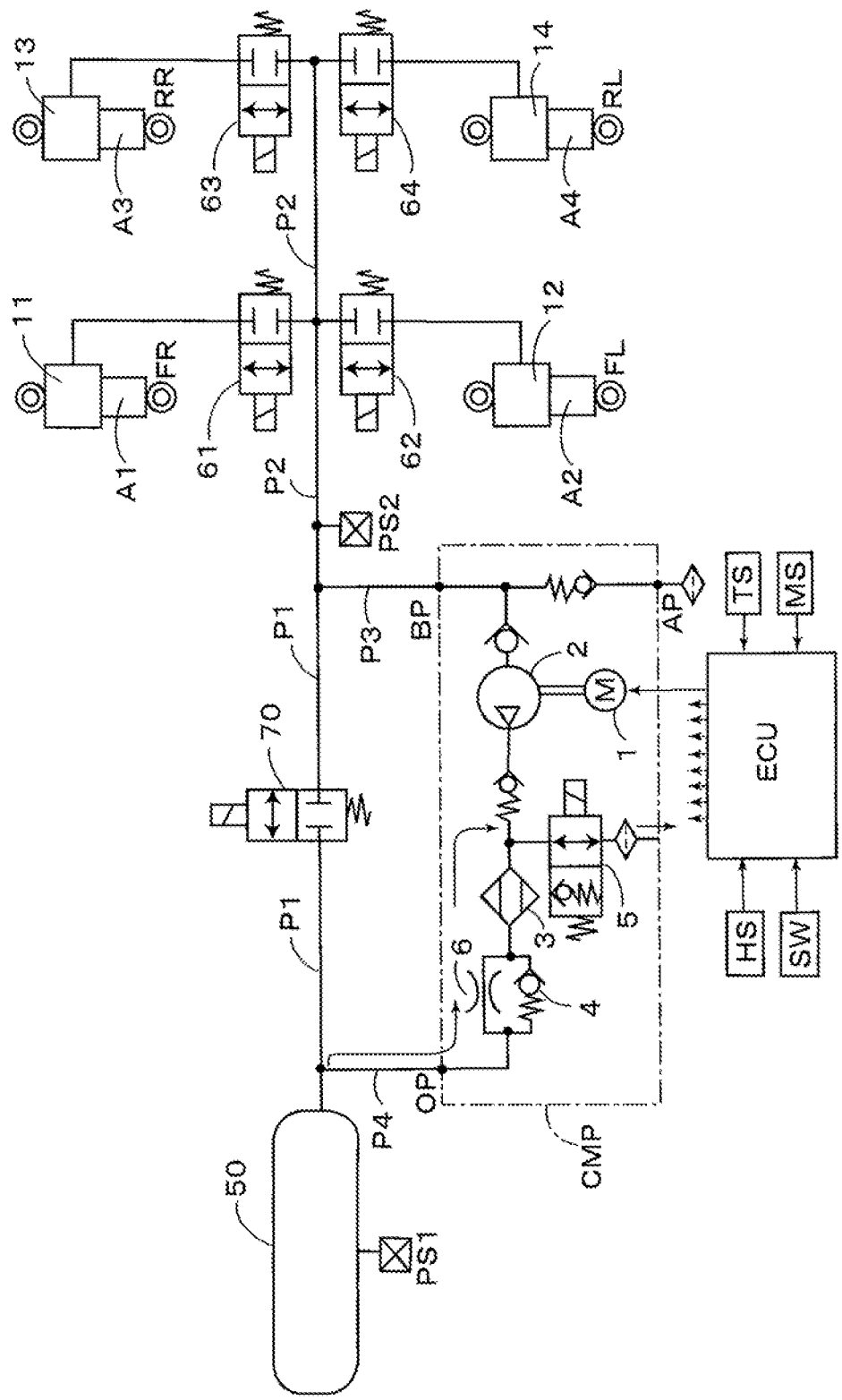
FIG. 6 is a block diagram showing a regeneration air discharge control according to an embodiment of the present invention.

When the desiccant agent (not shown) in the dryer 3 is required to be regenerated, after the above-described heat accumulation control is performed, as shown in FIG. 6, with the wheel switching valves 61-64 and the switching valve 70 being placed in their closed positions, the discharge switching valve 5 is placed in its open position by the control device ECU. Accordingly, as indicated by thin lines in FIG. 6, the dried air in the pressure accumulation tank 50 is supplied, through the flow passage P4, from the discharge port OP into the compressor device CMP, and supplied to the dryer 3 through the orifice 6, with its pressure (speed) being reduced, and then discharged from the discharge switching valve 5 placed in its open position to the atmosphere, whereby the desiccant agent (not shown) in the dryer 3 is regenerated, when the air is discharged. Thus, this control is called as the regeneration air discharge control.

Figure 16:
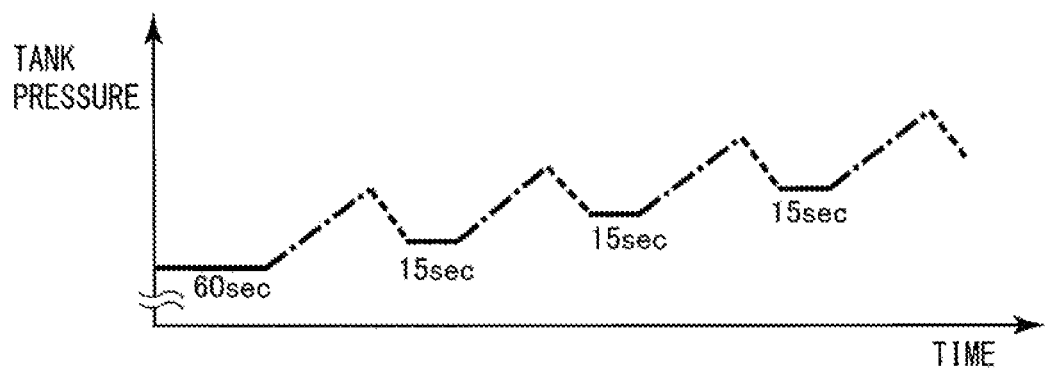
FIG. 16 is a graph showing an example of a pressure increase operation for a pressure accumulation tank including a heat accumulation control according to an embodiment of the present invention.

According to the present embodiment, as a part of the operation for increasing the pressure in the pressure accumulation tank 50, the controls as shown in FIGS. 4-6 are repeated by a plurality of cycles. For example, as shown in FIG. 16, before the air suction control as shown in FIG. 4 (indicated by dashed-dotted lines in FIG. 16) and the regeneration air discharge control as shown in FIG. 6 (indicated by dotted lines in FIG. 16), the heat accumulation control as shown in FIG. 5 (indicated by solid lines in FIG. 16) is performed for the duration of 60 seconds, for example, and the heat accumulation control in the following cycles are performed for the duration of 15 seconds, for example, so that the cycle of the heat accumulation control, the air suction control and the regeneration air discharge control are repeated by the plurality of cycles. During these controls, when the pressure detected by the pressure sensor PS1 reaches a predetermined pressure, e.g., tank pressures which are sequentially provided in stages, as indicated along the vertical axis in FIG. 16, the next heat accumulation control shall start. Consequently, by means of the air being high in temperature and low in pressure, an adsorbing rate of moisture of the desiccant agent (not shown) in the dryer 3 can be lowered, to regenerate the desiccant agent effectively.

Figure 17:
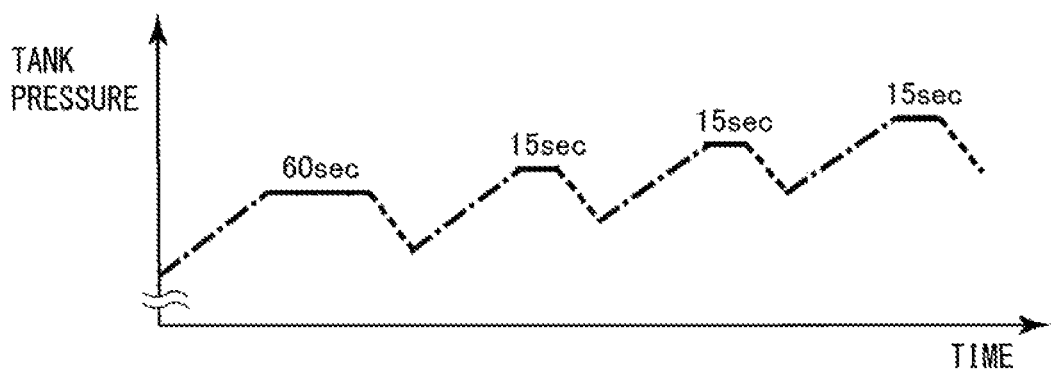
FIG. 17 is a graph showing another example of a pressure increase operation for a pressure accumulation tank including a heat accumulation control according to an embodiment of the present invention.

Or, it may be so constituted as shown in FIG. 17. That is, before the regeneration air discharge control in FIG. 6 (indicated by dotted lines in FIG. 17), and after the air suction control in FIG. 4 (indicated by dashed-dotted lines in FIG. 17), the heat accumulation control in FIG. 5 (indicated by solid lines in FIG. 17) is performed for the duration of 60 seconds, for example, and the heat accumulation control in the following cycles are performed for the duration of 15 seconds, for example, so that the cycle of the air suction control, the heat accumulation control and the regeneration air discharge control are repeated by the plurality of cycles. In each case, the heat accumulation control in the following cycles are sufficient to be of the duration of heat accumulation (heating) provided for compensating the heat lost in regenerating the agent, so that the duration is set to be shorter in time than the initial duration for the heat accumulation control, or may be omitted in some cases. The performing duration of the heat accumulation control may be provided arbitrarily as described above, or may be provided on the basis of a dew point in response to the results detected by the temperature sensor TS and humidity sensor MS. Or, it may be so constituted that the dew point in the dryer 3 can be detected directly, and that the necessity and performing duration of the heat accumulation control may be adjusted on the basis of the detected result.

Figure 18:
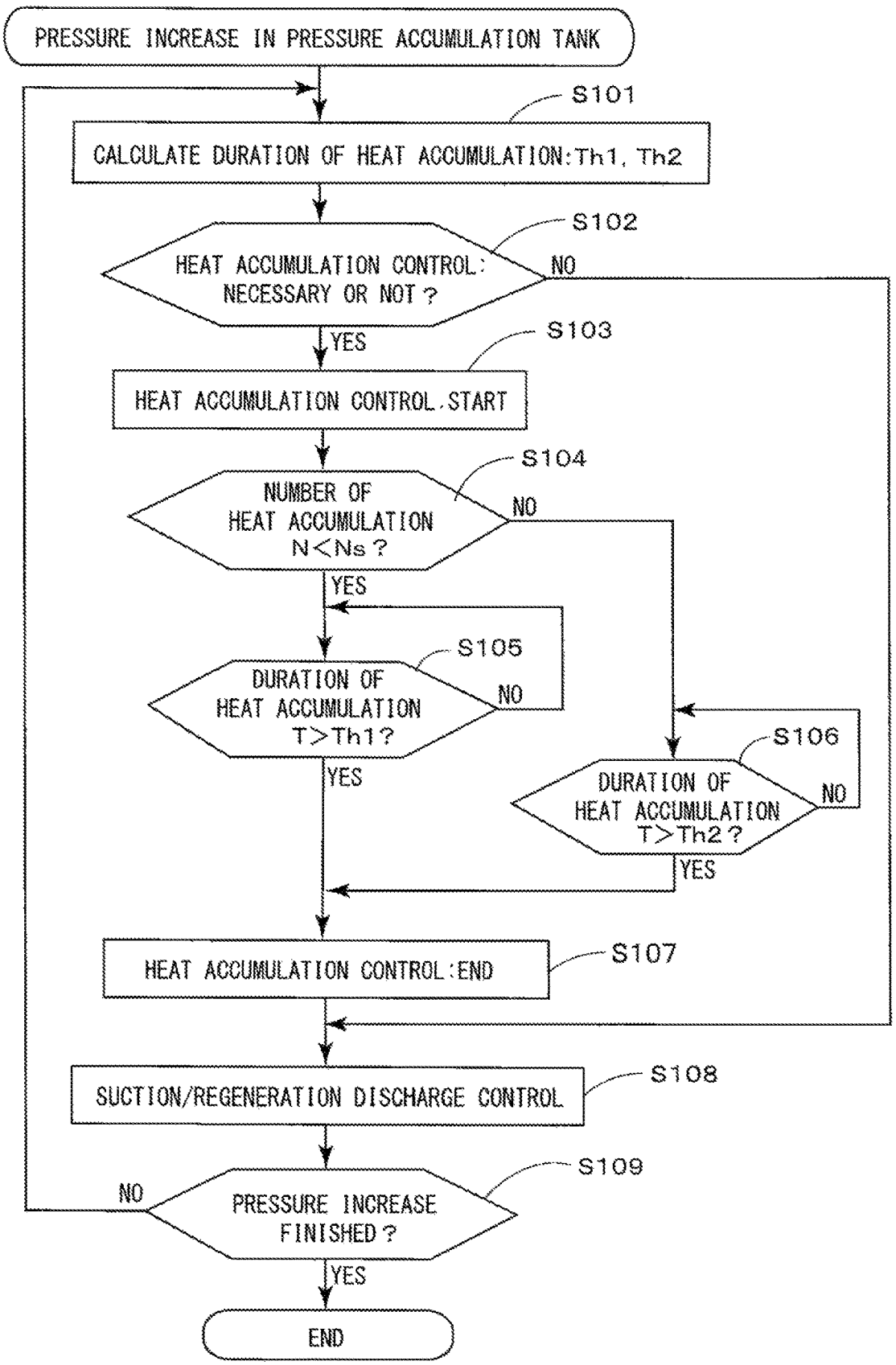
FIG. 18 is a flowchart showing an example of a pressure increase operation for a pressure accumulation tank including a heat accumulation control according to an embodiment of the present invention.

The pressure increase operation for the pressure accumulation tank 50 according to the present embodiment is performed by the control device ECU as shown in FIG. 18, for example, and the heat accumulation control is performed as a part of its control cycle. At the outset, in step S101, a duration of heat accumulation at the initial stage of starting the control (Th1) and a duration of heat accumulation under the control (Th2) are calculated on the basis of the result detected by the temperature sensor TS, for example. The heat accumulation duration (Th1) corresponds to the duration of the control being performed, which is provided when the number (N) of the heat accumulation controls is smaller than a predetermined number (Ns), and corresponds to the duration of "60 sec" as indicated in FIG. 16, for example, and the heat accumulation duration (Th2) corresponds to the duration of the control being performed, which is provided when the number (N) of the heat accumulation controls is equal to or greater than the predetermined number (Ns), and corresponds to the duration of "15 sec" as indicated in FIG. 16, for example. Therefore, it is normally set to be Th1>Th2. Next, in step S102, the necessity of the heat accumulation control is determined on the basis of the results detected by the humidity sensor MS and temperature sensor TS. If it is determined that the heat accumulation control is needed, then the program proceeds to step S103, where the heat accumulation control is performed, whereas if it is determined to be unnecessary, then the program jumps to step S108.

Next to the step S103, the number (N) of the heat accumulation controls is compared with the predetermined number (Ns), and if it is determined that the number (N) of the heat accumulation controls is smaller than the predetermined number (Ns), the program proceeds to step S105, where the heat accumulation control is continued, until the duration (T) after the control started exceeds the heat accumulation duration (Th1). On the contrary, if the number (N) of the heat accumulation controls is equal to or greater than the predetermined number (Ns), the program proceeds to step S106, where the heat accumulation control is continued, until the duration (T) after the control started exceeds the heat accumulation duration (Th2), and then the heat accumulation control is terminated in step S107. Thereafter, the air suction control (indicated by the dashed-dotted lines in FIG. 16) or the regeneration air discharge control (indicated by the dotted lines in FIG. 17) is performed in step S108. Then, it is determined in step S109 whether the pressure in the pressure accumulation tank 50 has reached the predetermined pressure, and if it has not reached the predetermined pressure, the cycle of steps S101-108 is repeated. If it has reached the predetermined pressure, whereby it is determined that the pressure increase operation has been finished, then the pressure increase control is terminated.

With respect to the switching device that opens or closes the flow passage P1 according to the embodiment as described above, it may be configured as shown in FIG. 7. That is, in addition to the switching valve 70, there may be disposed a three-port two-position changeover valve 80, which is arranged in parallel with the switching valve 70, and disposed between the discharge port OP of the compressor device CMP and the pressure accumulation tank 50. The three-port two-position changeover valve 80 provides a first position (i.e., normal position as indicated in FIG. 7) that communicates the discharge port OP with the pressure accumulation tank 50, and that blocks the communication between the pressure accumulation tank 50 and the flow passage P1, and a second position that communicates the pressure accumulation tank 50 with the flow passage P1, and that blocks the communication between the discharge port OP and the pressure accumulation tank 50, and it is so constituted that either the first position or the second position is selected by the control device ECU.

Figure 7:
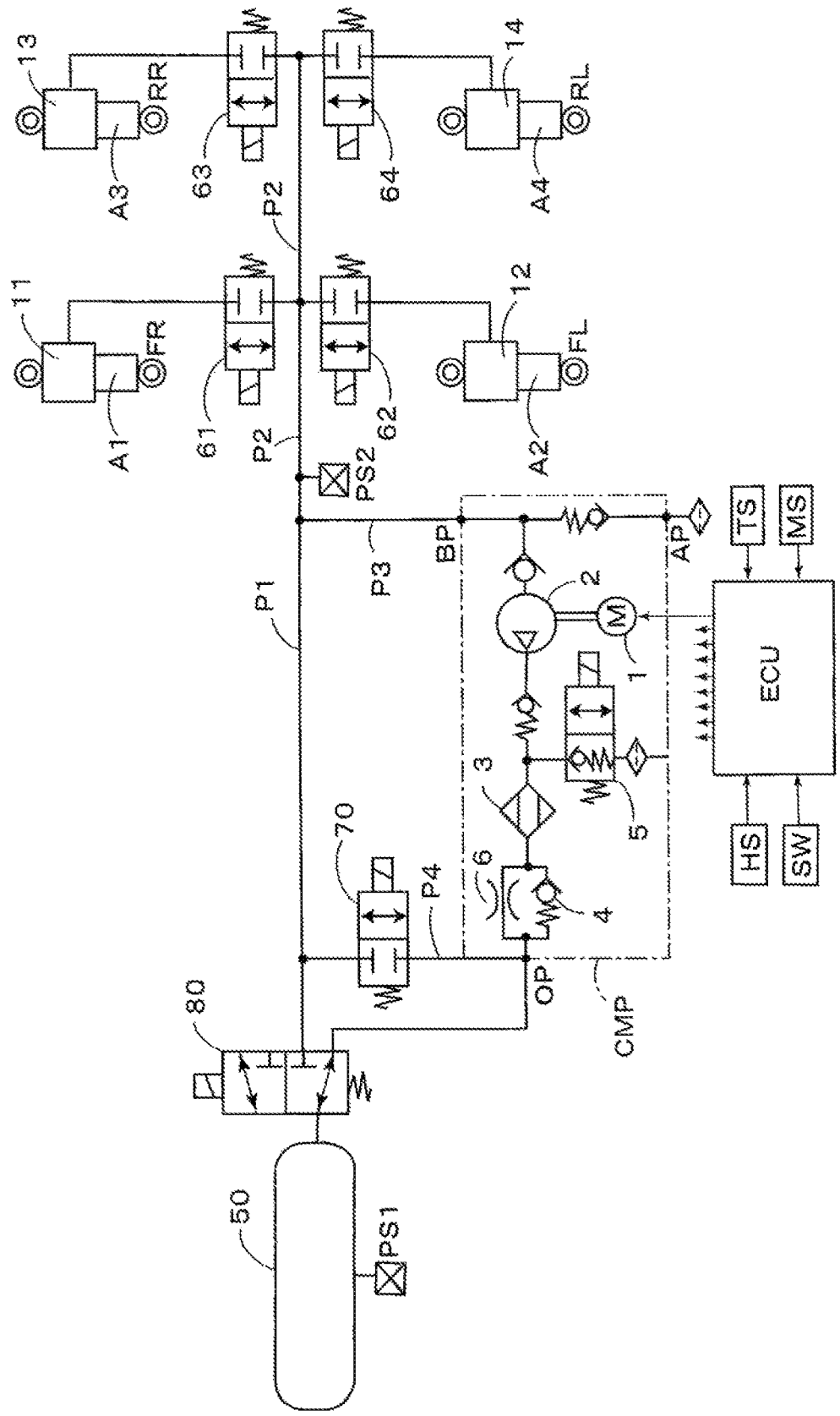
FIG. 7 is a block diagram showing a fundamental configuration of an air suspension device for use in another embodiment of the present invention.

According to the heat accumulation control in the embodiment as shown in FIG. 7, the wheel switching valves 61-64 and the three-port two-position changeover valve 80 being placed as shown in FIG. 7, the switching valve 70 is placed in its open position. Therefore, there is formed such a circulation passage that the compressed air is discharged from the discharge port OP, and introduced into the back pressure introduction port BP, through the flow passage P4, the switching valve 70 placed in its open position, the flow passage P1 and the flow passage P3. Accordingly, the compressed air, which is heated by the compressing operation of the pump device 2, is discharged from the discharge port OP through the dryer 3, and introduced into the back pressure introduction port BP through the above-described circulation passage, so that the heat of compression of the compressed air is accumulated in the dryer 3.

Figure 8:
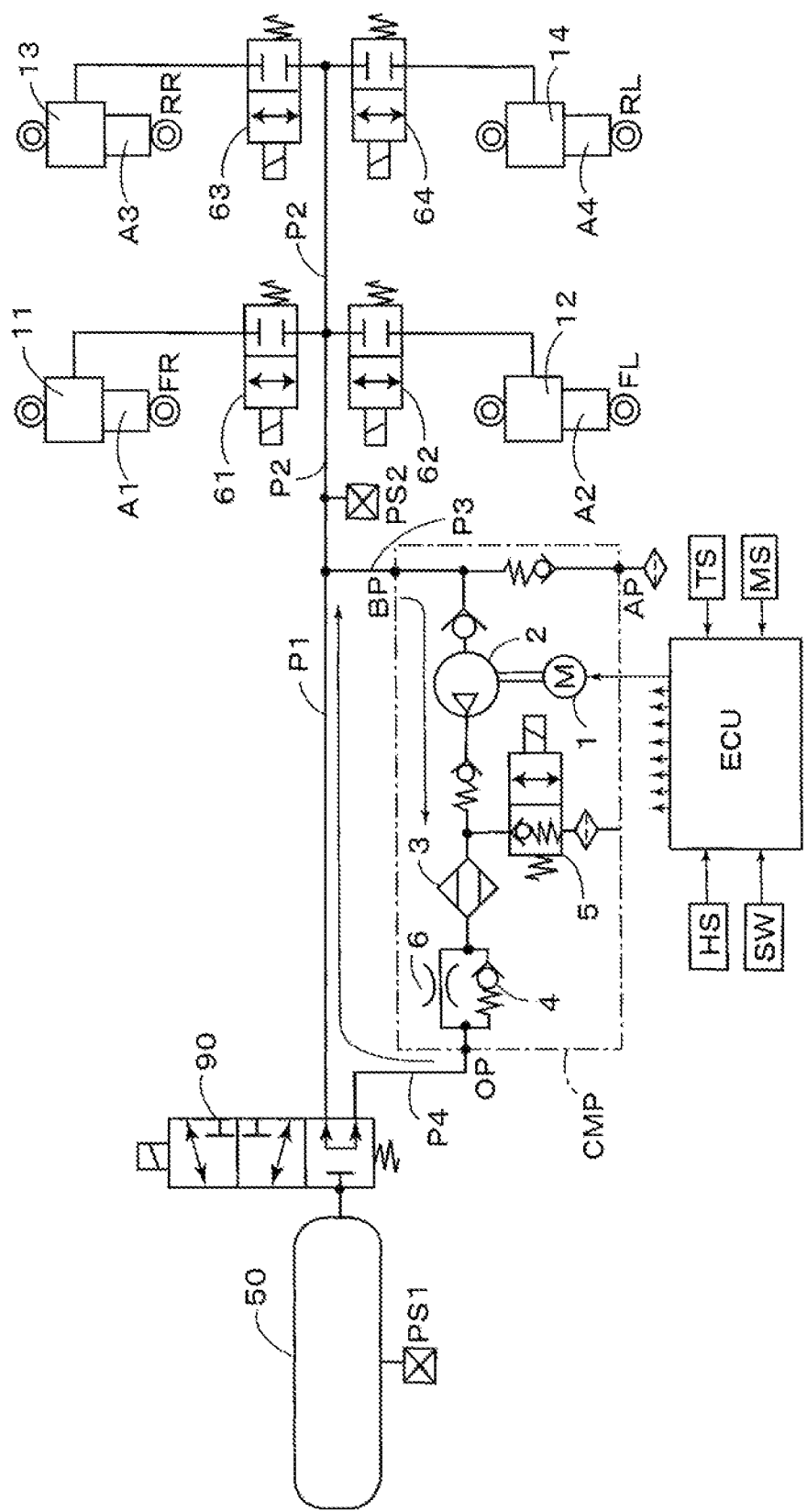
FIG. 8 is a block diagram showing a heat accumulation control according to a fundamental configuration of an air suspension device for use in a further embodiment of the present invention.

Or, the above-described switching device may be configured as shown in FIG. 8. That is, there may be disposed a three-port three-position changeover valve 90, which is disposed between the discharge port OP of the compressor device CMP and the pressure accumulation tank 50. The three-port three-position changeover valve 90 provides a first position (i.e., normal position as indicated in FIG. 8) that communicates the discharge port OP with the flow passage P1, and that blocks the communication between the discharge port OP and the pressure accumulation tank 50, and a second position that communicates the discharge port OP with the pressure accumulation tank 50, and that blocks the communication between the pressure accumulation tank 50 and the flow passage P1, and a third position that communicates the pressure accumulation tank 50 with the flow passage P1, and that blocks the communication between the discharge port OP and the pressure accumulation tank 50, and it is so constituted that one of the first to third positions is selected by the control device ECU.

According to the heat accumulation control in the embodiment as shown in FIG. 8, there is formed such a circulation passage that the compressed air is discharged from the discharge port OP, and introduced into the back pressure introduction port BP, through the flow passage P4, the switching valve 90 placed in its normal position as shown in FIG. 8, the flow passage P1 and the flow passage P3. Accordingly, as shown in thin arrow lines in FIG. 8, the compressed air, which is heated by the compressing operation of the pump device 2, is discharged from the discharge port OP through the dryer 3, and introduced into the back pressure introduction port BP through the above-described circulation passage, so that the heat of compression of the compressed air is accumulated in the dryer 3. Particularly, according to the configuration as shown in FIG. 8, in the case where the three-port three-position switching valve 90 is placed in its first position (normal position), the pressure accumulation tank 50 is blocked against the flow passage P1, when each control is stopped, so that a proper airtightness can be obtained. Also, in case of the heat accumulation control, as the pressure accumulation tank 50 is placed in its blocked state, the air containing moisture may not be supplied to the pressure accumulation tank 50, the regeneration function will be improved. In addition, as the pressure in the pressure accumulation tank 50 is not applied to the compressor device CMP, and the back pressure introduction port BP and the discharge port OP come to be equal in pressure, a vibration which may be caused when the operation is stopped, can be reduced, and its mobility may be improved. Other configurations as shown in FIGS. 7 and 8 are the same as those shown in FIG. 1, so that explanation about substantially the same configurations will be omitted herein, by applying the same reference numerals as those shown in FIG. 1.

FIGS. 9-13 show another embodiment according to the present invention, a fundamental configuration of which is the same as the embodiment as shown in FIG. 1. According to the present embodiment, a switching valve 71 is connected to the flow passage P2 (first flow passage) between the pressure accumulation tank 50 and the wheel switching valves 61-64, and connected to the discharge port OP of the compressor device CMP. Also, a switching valve 81 is connected to the flow passage P4 (second flow passage) between the discharge port OP and the pressure accumulation tank 50. Furthermore, a switching valve 72 and a switching valve 82 are disposed in the flow passage P1 (first flow passage) between the wheel switching valves 61-64 and the pressure accumulation tank 50, and arranged in parallel with the switching valve 71 and switching valve 81. Then, a position between the switching valve 72 and switching valve 82 is connected to the back pressure introduction port BP of the compressor device CMP, and a position between the switching valve 71 and switching valve 81 is connected to the discharge port OP of the compressor device CMP. Accordingly, the compressed air, which is heated by compressing operation of the pump device 2, is discharged from the discharge port OP, and introduced into the back pressure introduction port BP through the flow passages P4 and P3 (second flow passage), so that the heat of compression of the compressed air is accumulated in the dryer 3. Controls of the switching valves 71,72 and switching valves 81, 82 performed by the control device ECU will be described later with reference to FIGS. 10-13.

The above-described switching valves 71 and 72 constitute a first supply-discharge switching valve and a second supply-discharge switching valve, respectively, and the switching valves 81 and 82 constitute a first tank switching valve and a second tank switching valve, respectively. According to the present embodiment, it is effectively functioned, when the pressure in the pressure accumulation tank 50 is smaller than the pressure in the air chambers 11-14. The wheel switching valves 61-64, switching valves 71, 72 and switching valves 81, 82 are configured by normally-closed electromagnetic valves, at closed positions of which relief valves are configured, and controlled to be opened or closed by the control device ECU, as described later, and the electric motor 1 is controlled to be driven, and the air spring devices A1-A4 are controlled. Configurations of the compressor device CMP and etc. are the same as those described before, so that explanation about substantially the same configurations will be omitted herein, by applying the same reference numerals.

Figure 9:
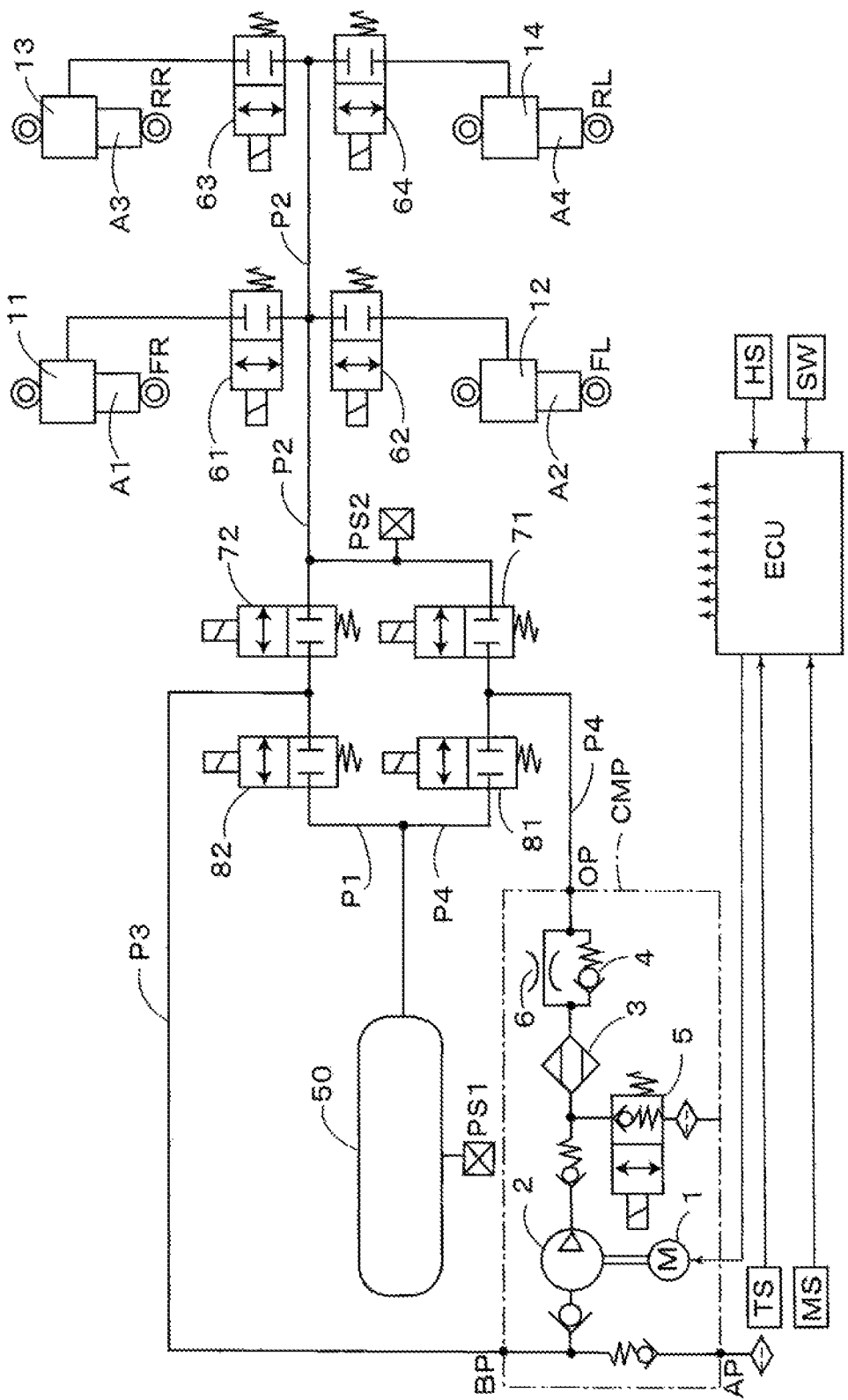
FIG. 9 is a block diagram showing a fundamental configuration of an air suspension device for use in a further embodiment of the present invention.

Herein, after a conventional vehicle height adjustment control of the air suspension device of the embodiment as shown in FIG. 9 is explained, the regeneration control of the dryer 3 will be explained. At the outset, in the normal case where sufficient compressed air is stored in the pressure accumulation tank 50, each switching valve is placed in its closed position as shown in FIG. 9, and the electric motor 1 is not operated, i.e., stopped state. For example, when the vehicle height increase (raising) command is detected in the control device ECU, if the pressure detected by the pressure sensor PS1 is equal to or greater than the predetermined pressure "K1", the switching valve 72, switching valve 82 and wheel switching valves 61-64 are placed in their open positions, then, the compressed air in the pressure accumulation tank 50 is supplied to the air chambers 11-14 through the flow passages P1 and P2, so that the air chambers 11-14 are expanded to increase (raise) the vehicle height. When the vehicle height has reached the desired height, the switching valve 72, switching valve 82 and wheel switching valves 61-64 are placed in their closed positions.

When the pressure in the pressure accumulation tank 50 is decreased to be smaller than the pressure in the air chambers 11-14, so that if the pressure detected by the pressure sensor PS1 is decreased to be smaller than the predetermined pressure "K2" (<K1), for example, the switching valves 71 and 82 are placed in their open positions, and the electric motor 1 is driven by the control device ECU. Then, the compressed air in the pressure accumulation tank 50 is introduced into the back pressure introduction port BP of the compressor device CMP, through the switching valve 82 placed in its open position, and the flow passage P3, and supplied from the discharge port OP to the air chambers 11-14, through the flow passages P4 and P2, the switching valve 71 placed in its open position, and the wheel switching valves 61-64 placed in their open positions, until the vehicle height reaches the desired height. Thus, the compressed air is directly supplied from the compressor device CMP to the air chambers 11-14, and the introduced air is supplied from the pressure accumulation tank 50. Accordingly, as the pressure difference between the compressed air discharged from the discharge port OP and the air introduced into the back pressure introduction port BP is very small comparing with the difference between that and the atmospheric pressure, so that a load to the compressor device CMP is small, whereby the compressed air can be supplied efficiently to the air chambers 11-14.

On the other hand, in the case as shown in FIG. 9, when the vehicle height decrease (lowering) command is detected, the wheel switching valves 61-64, switching valve 72 and switching valve 81 are placed in their open positions, and the electric motor 1 is driven. Consequently, the compressed air in the air chambers 11-14 is supplied into the pressure accumulation tank 50, through the flow passage P2, switching valve 72 placed in its open position, flow passage P3, pump device 2, dryer 3, check valve 4 and switching valve 81 placed in its open position, so that the air chambers 11-14 are reduced to decrease (lower) the vehicle height, and the pressure is accumulated in the pressure accumulation tank 50. When the vehicle height has reached the desired height, the electric motor 1 is stopped, and the wheel switching valves 61-64, switching valve 72 and switching valve 81 are placed in their closed positions.

Irrespective of the vehicle height adjustment control and etc., when the desiccant agent (not shown) in the dryer 3 is required to be regenerated, the switching valve 81 and discharge switching valve 5 are placed in their open positions, so that the dried air in the pressure accumulation tank 50 is discharged, through the orifice 6 and dryer 3, whereby the desiccant agent (not shown) in the dryer 3 is regenerated, when the air is discharged. This regeneration air discharge control will be described later with reference to FIG. 12. Thereafter, the discharge switching valve 5 is returned to be in its closed position, and the electric motor 1 is driven, so that the atmosphere is sucked from the atmosphere suction port AP, and the compressed air produced by the pump device 2 is supplied from the discharge port OP to the pressure accumulation tank 50 through the switching valve 81 placed in its open position. When the pressure detected by the pressure sensor PS1 is equal to or greater than the predetermined pressure "K3" (>K1), the switching valve 81 is placed in its closed position, and the electric motor 1 is stopped, so that the pressure accumulation tank 50 is returned to its state for holding the high pressure.

Figure 10:
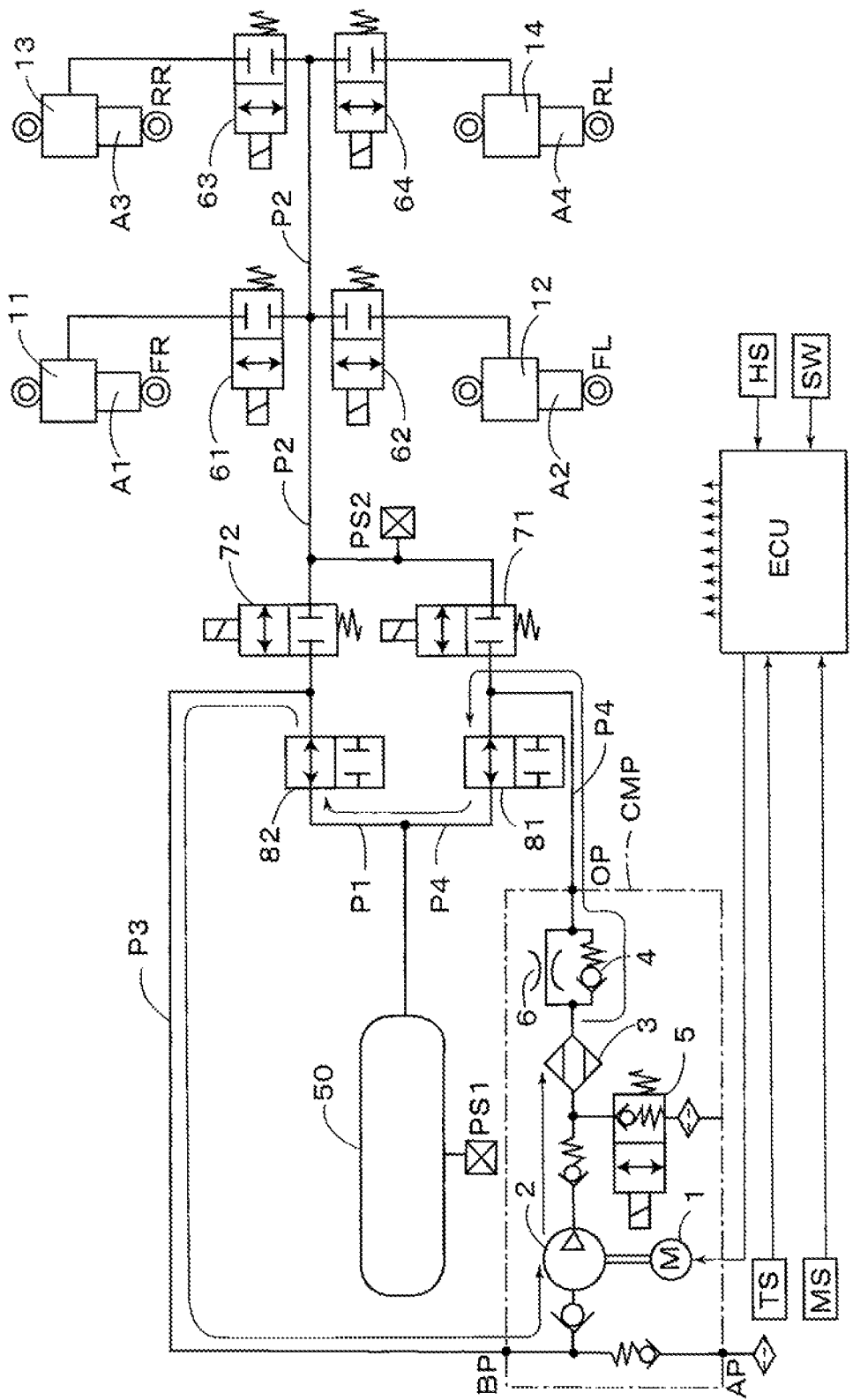
FIG. 10 is a block diagram showing a heat accumulation control according to a further embodiment of the present invention.

Next, will be described about such controls performed by the control device ECU as the drive control of the pump device 2, heat accumulation control performed according to the opening or closing operation of the switching valves 81, 82, air suction control, and regeneration air discharge control, with reference FIGS. 10-12. FIG. 10 shows the heat accumulation control similar to the aforementioned embodiments, whereby the compressed air, which is heated by compressing operation of the pump device 2, is discharged from the discharge port OP through the dryer 3, and introduced into the back pressure introduction port BP, through the switching valves 81, 82 placed in their open positions by the control device ECU, and the flow passages P4 and P3 (second flow passage), as indicated by thin arrow lines in FIG. 10, so that the heat of compression of the compressed air is accumulated in the dryer 3.

Figure 11:
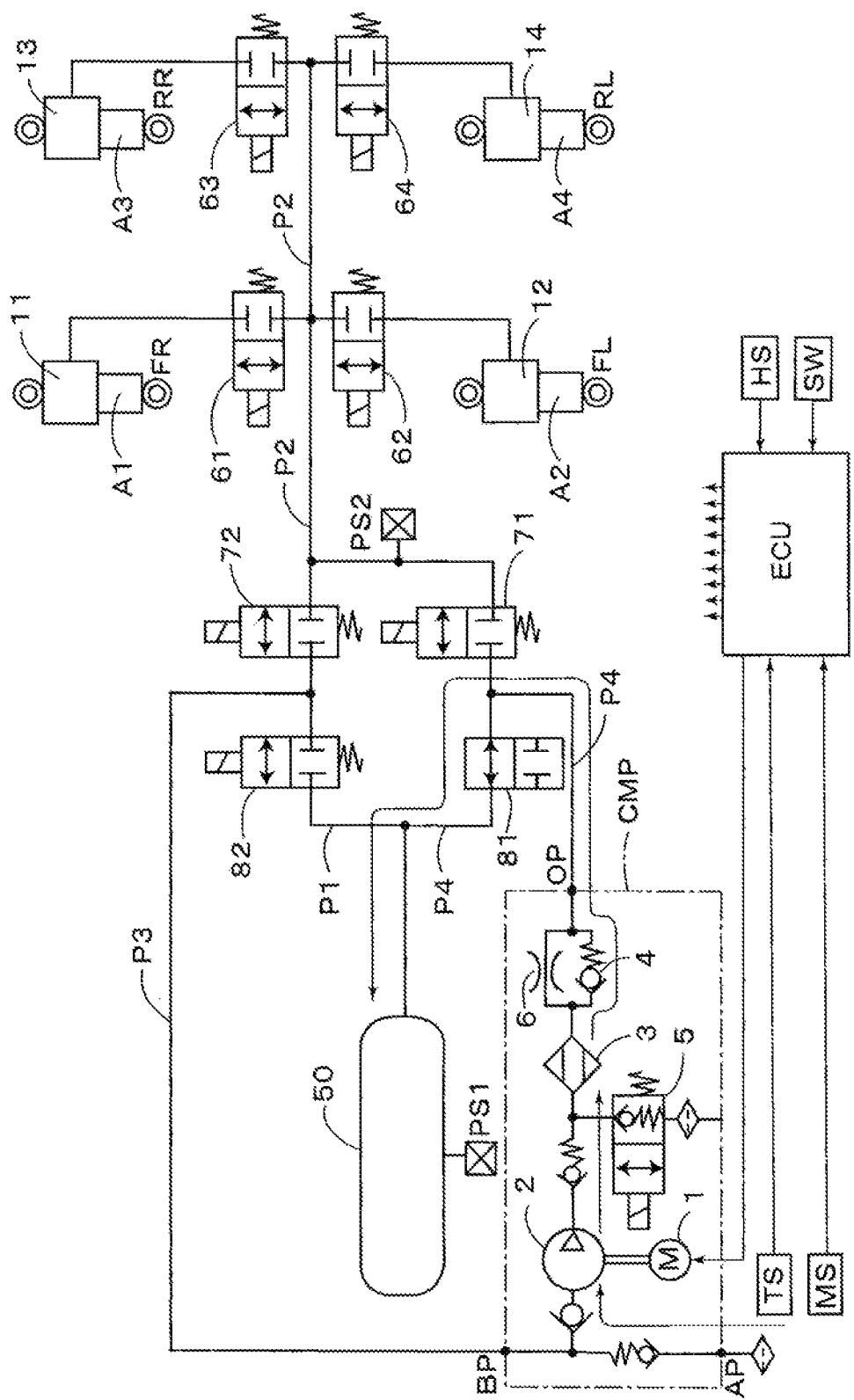
FIG. 11 is a block diagram showing an air suction control according to a further embodiment of the present invention.

FIG. 11 shows the air suction control according to the present embodiment. By means of the control device ECU, the switching valve 81 is placed in its open position and the electric motor 1 is driven, with the switching valve 82 and etc. being in their closed positions, the air sucked from the atmosphere suction port AP is compressed by the pump device 2, so that the compressed air is discharged from the discharge port OP through the dryer 3 and check valve 4, and supplied into the pressure accumulation tank 50 through the switching valve 81 placed in its open position. Accordingly, when the pressure detected by the pressure sensor PS1 reaches a predetermined pressure, e.g., tank pressures sequentially provided in stages, as indicated on the vertical axis in FIG. 16, the switching valve 81 is placed in its closed position, and the electric motor 1 is stopped.

Figure 12:
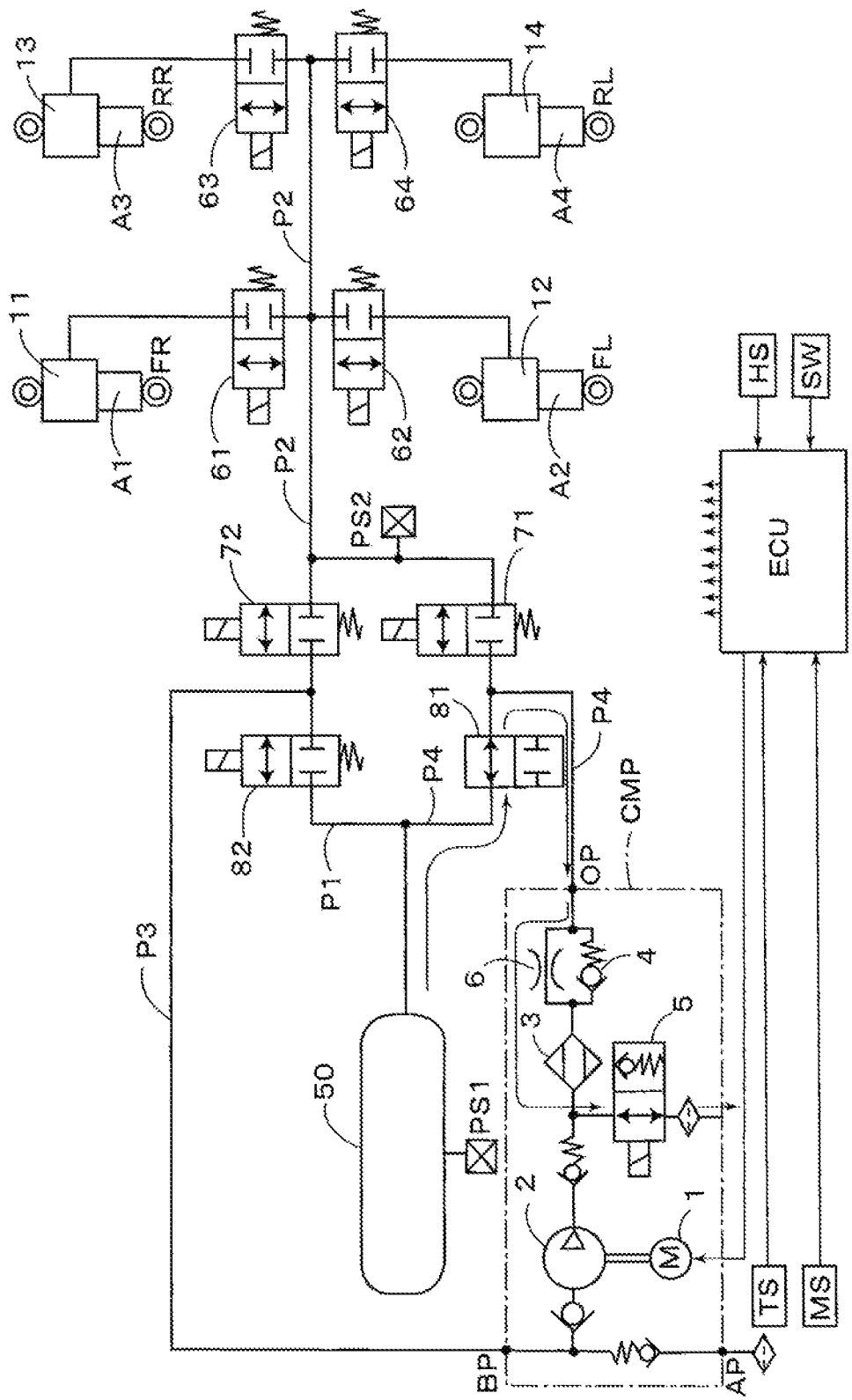
FIG. 12 is a block diagram showing a regeneration air discharge control according to a further embodiment of the present invention.

FIG. 12 shows the regeneration air discharge control, wherein the switching valve 81 and discharge switching valve 5 are placed in their open positions by the control device ECU, so that the compressed air in the pressure accumulation tank 50 is supplied from the discharge port OP into the compressor device CMP, and reduced in pressure through the orifice 6 and supplied to the dryer 3, through which the desiccant agent (not shown) is regenerated, to be discharged to the atmosphere through the discharge switching valve 5 placed in its open position. When the pressure detected by the pressure sensor PS1 reaches the predetermined pressures, e.g., tank pressures sequentially provided in stages, as indicated on the vertical axis in FIG. 16, the switching valve 81 is placed in its closed position. In this embodiment, each control as shown in FIGS. 10-12 is repeated by a plurality of cycles as shown in FIG. 16 or FIG. 17, in the same manner as described in the aforementioned embodiment, the explanation of which is omitted herein to avoid repetition, while the heat accumulation control in this embodiment is shown in FIG. 10, the air suction control is shown in FIG. 11, and the regeneration air discharge control is shown in FIG. 12.

Figure 13:
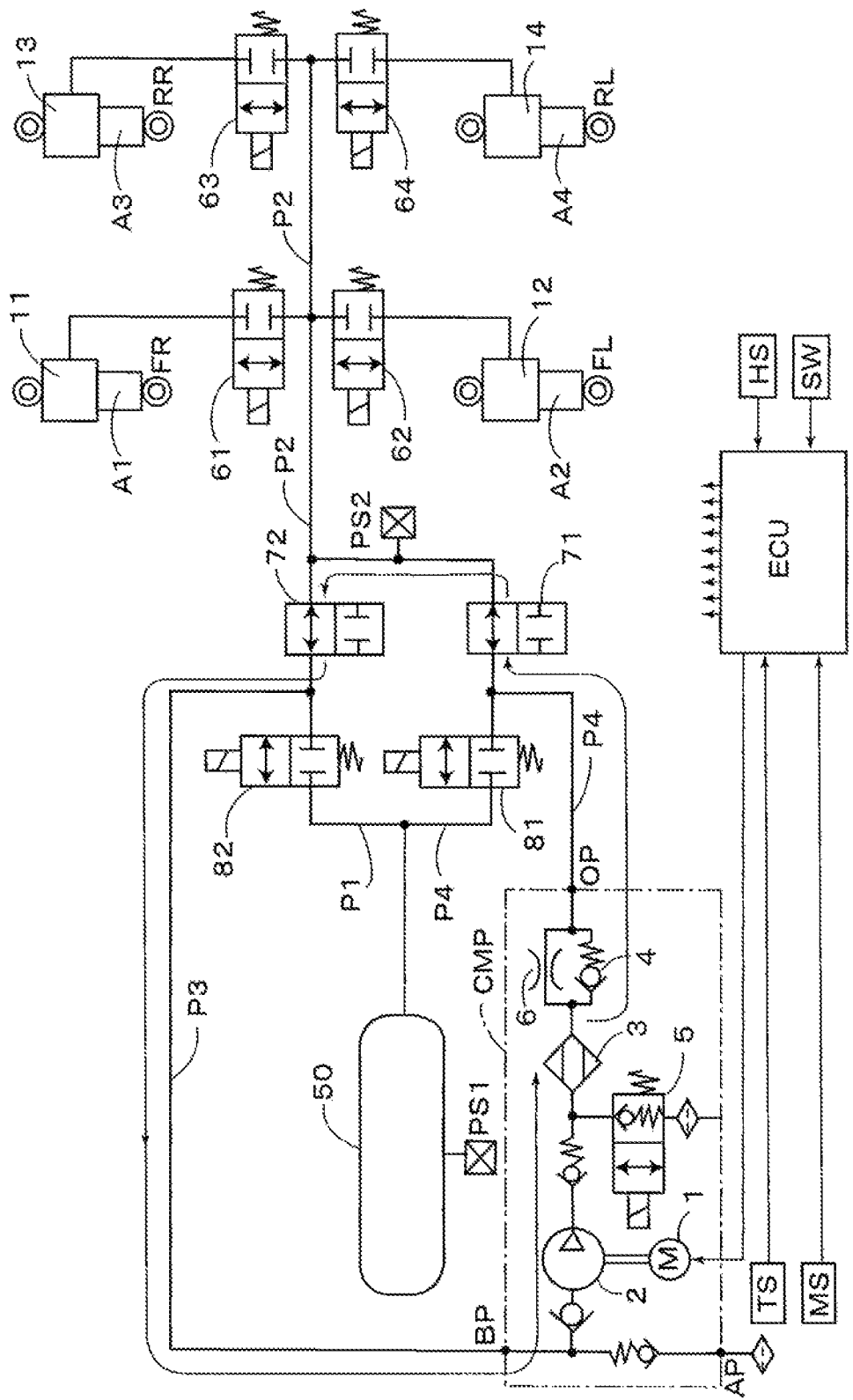
FIG. 13 is a block diagram showing another heat accumulation control according to a further embodiment of the present invention.

FIG. 13 shows another embodiment of the heat accumulation control, wherein opening or closing control of the switching valves 71, 72 is performed by the control device ECU, instead of the opening or closing control of the switching valves 81, 82 in FIG. 10. According to the heat accumulation control in this embodiment, the compressed air, which is heated by compressing operation of the pump device 2, is discharged from the discharge port OP through the dryer 3, and introduced into the back pressure introduction port BP, through the switching valves 71, 72 placed in their open positions, and the flow passages P3, P4 (second flow passage), as indicated by thin arrow lines in FIG. 13, so that the heat of compression of the compressed air is accumulated in the dryer 3. Thus, according to the embodiment as shown in FIG. 9, the heat accumulation control can be achieved as shown in FIG. 10 or FIG. 13.

Figure 14:
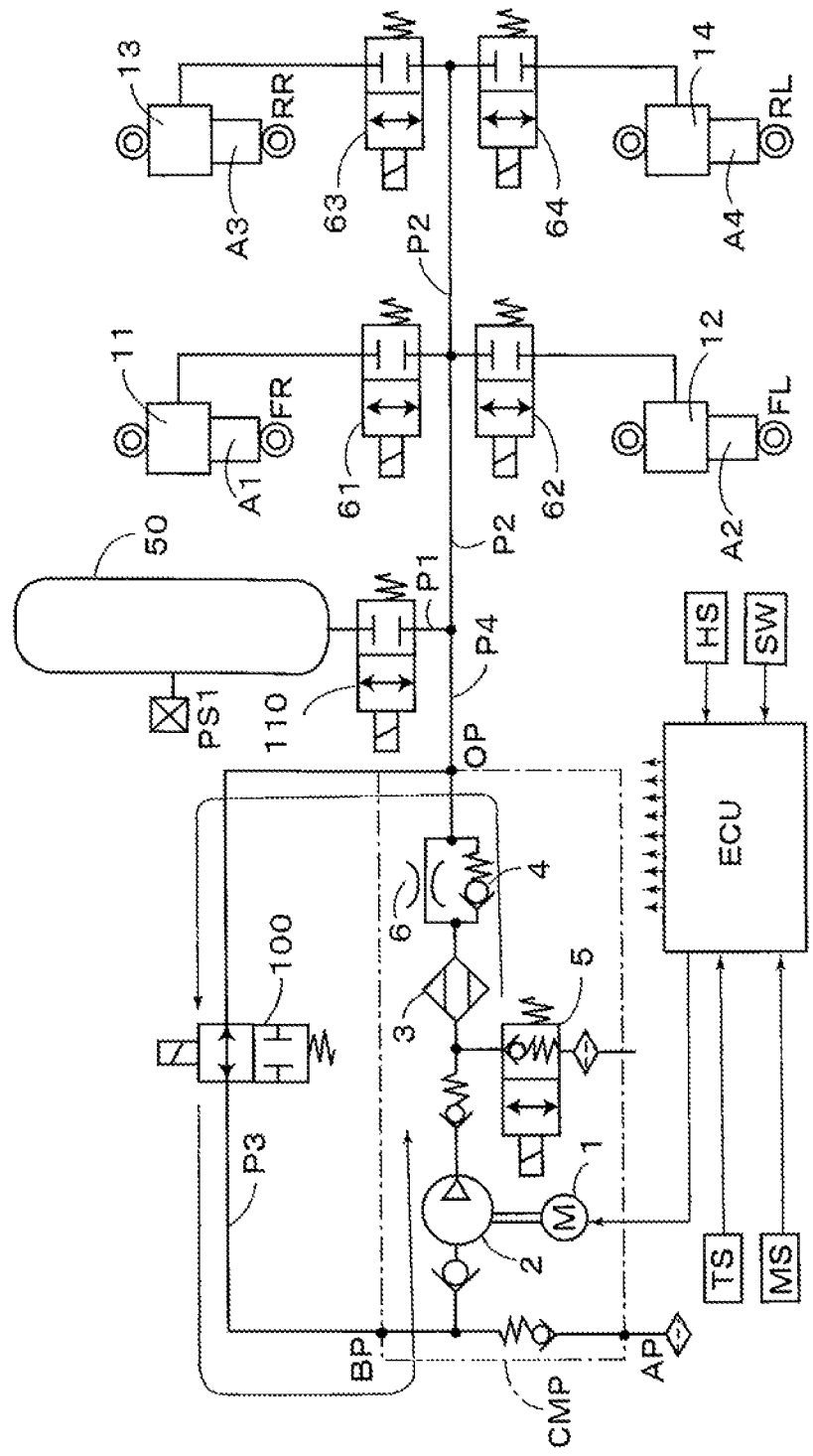
FIG. 14 is a block diagram showing a heat accumulation control according to a further embodiment of an air suspension device having a pressure accumulation tank.

FIG. 14 shows the heat accumulation control for a further embodiment of the air suspension device having the pressure accumulation tank 50, wherein the compressor device CMP is provided with the atmosphere suction port AP that suctions the atmosphere (outside air), discharge port OP that discharges the compressed air through the dryer 3, and the back pressure introduction port BP that introduces the air in the wheel switching valves 61-64. The discharge port OP is connected to the wheel switching valves 61-64 through the flow passage P4 (and flow passage P2), and connected to the back pressure introduction port BP through the flow passage P3, and the pressure accumulation tank 50 is connected to the wheel switching valves 61-64 through the flow passage P1 (and flow passage P2). Furthermore, it comprises a normally-closed switching valve 100 (FIG. 14 shows its open position for the heat accumulation control), which is disposed in the flow passage P3, and a normally-closed switching valve 110, which is disposed in the flow passage P1. By means of the control device ECU, the wheel switching valves 61-64 and switching valves 100 and 110 are controlled to be opened or closed, to control supplying and discharging the air to and from the air spring devices A1-A4, and perform the heat accumulation control as described before. According to control by the control device ECU, therefore, the compressed air, which is heated by compressing operation of the pump device 2, is discharged from the discharge port OP through the dryer 3, and introduced into the back pressure introduction port BP, through the switching valve 100 placed in its open position and the flow passage P3, as indicated by thin arrow lines in FIG. 14, so that the heat of compression of the compressed air is accumulated in the dryer 3.

Figure 15:
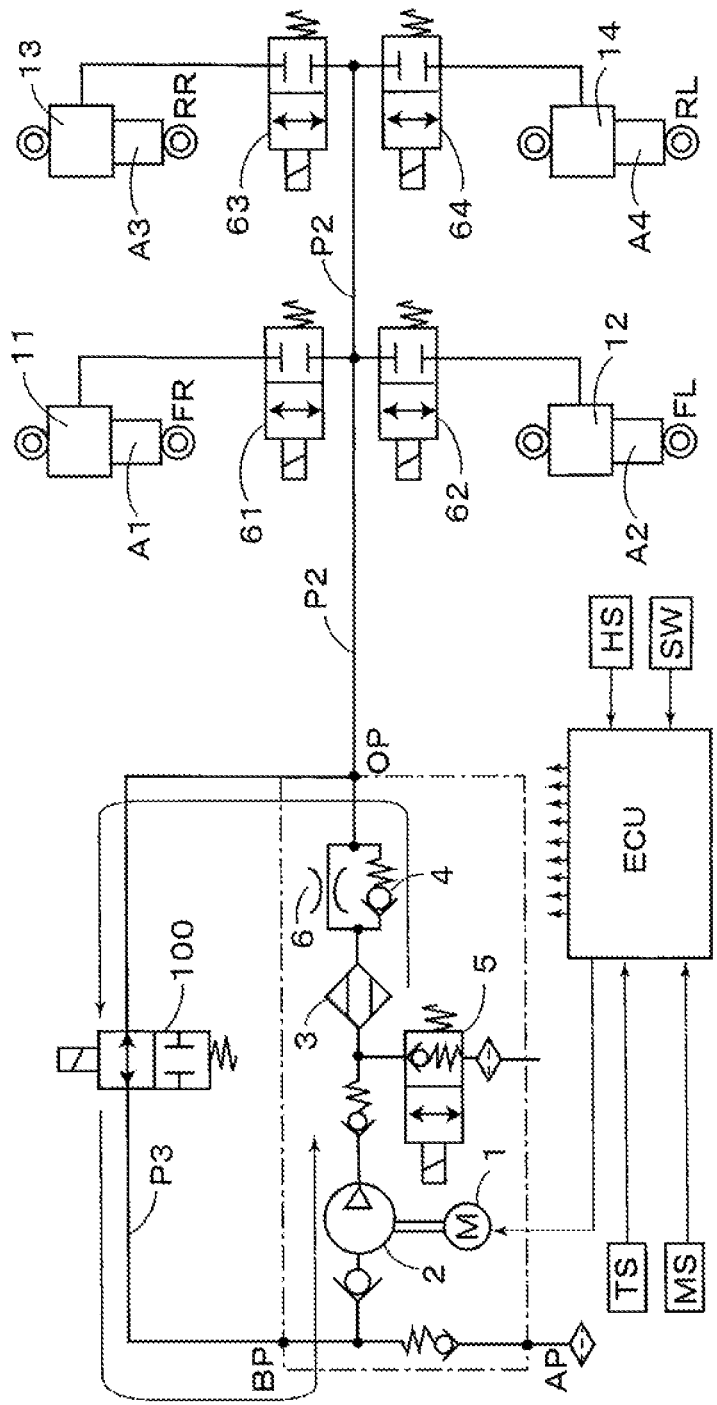
FIG. 15 is a block diagram showing a heat accumulation control according to a reference embodiment of an air suspension device.

FIG. 15 shows a reference embodiment of a heat accumulation control for an air suspension device of an open type, which is not provided with the pressure accumulation tank 50 as described above. In this embodiment, the flow passage P3 that provides the circulation passage as described before, and the normally-closed switching valve 100 is disposed in the flow passage P3. According to the heat accumulation control in this embodiment, when the switching valve 100 is placed in its open position by the control device ECU, the compressed air, which is heated by compressing operation of the pump device 2, is discharged from the discharge port OP through the dryer 3, and introduced into the back pressure introduction port BP, through the switching valve 100 placed in its open position and the flow passage P3, as indicated by thin arrow lines in FIG. 15, so that the heat of compression of the compressed air is accumulated in the dryer 3.

DESCRIPTION OF CHARACTERS

A1-A4 air spring device
CMP compressor device
AP atmosphere suction port
BP back pressure introduction port
OP discharge port
P1, P2 flow passage (first flow passage)
P3, P4 flow passage (second flow passage)
1 electric motor
2 pump device
3 dryer
4 check valve
5 discharge switching valve
11-14 air chamber
50 pressure accumulation tank
61-64 wheel switching valve (control valve)
70 switching valve (switching device)
71 switching valve (first supply-discharge switching valve)
72 switching valve (second supply-discharge switching valve)
81 switching valve (first tank switching valve)
82 switching valve (second tank switching valve)
80 three-port two-position changeover valve (switching device)
90 three-port three-position changeover valve (switching device)
100 switching valve (switching device)

The invention claimed is:

1. A dryer regeneration method for an air suspension system, which comprises an air spring device provided with an air chamber and mounded on each wheel of a vehicle,
a pressure accumulation tank that supplies compressed air to the air spring device,
a compressor device that supplies the compressed air at least to the pressure accumulation tank, and that includes an electric motor served as a power source, a pump device driven by the electric motor to produce the compressed air, and a dryer that dries the compressed air produced by the pump device, and
a control device that performs a vehicle height increase control by communicating the pressure accumulation tank with the air spring device to supply the compressed air to the air chamber, a vehicle height decrease control by communicating the air spring device with the compressor device to discharge the air in the air chamber through the compressor device, an air suction control by communicating the compressor device with the pressure accumulation tank to supply outside air to the pressure accumulation tank, and a regeneration air discharge control by communicating the pressure accumulation tank with the compressor device to discharge the air in the pressure accumulation tank to the outside through the dryer, wherein
the control device performs a heat accumulation control, by driving the pump device, with the communication between the compressor device and the air spring device being blocked, supplying the compressed air discharged through the dryer to the pump device to be circulated, and accumulating heat of compression of the compressed air in the dryer, to regenerate the dryer.

2. The dryer regeneration method for the air suspension system as recited in claim 1, wherein the control device performs the heat accumulation control before the regeneration air discharge control, and before or after the air suction control.

3. The dryer regeneration method for the air suspension system as recited in claim 1, wherein a temperature sensor is provided for detecting a temperature of the outside air supplied from the compressor device to the pressure accumulation tank, and wherein
the control device determines necessity of the heat accumulation control based on at least a result detected by the temperature sensor.

4. The dryer regeneration method for the air suspension system as recited in claim 3, wherein a humidity sensor is provided for detecting a humidity of the outside air supplied from the compressor device to the pressure accumulation tank, and wherein the control device determines necessity of the heat accumulation control based on the results detected by the humidity sensor and temperature sensor.

5. The dryer regeneration method for the air suspension system as recited in claim 4, wherein the control device adjusts a performing duration of the heat accumulation control based on the results detected by the humidity sensor and temperature sensor.

6. The dryer regeneration method for the air suspension system as recited in claim 1, wherein the compressor device comprises;
an atmosphere suction port that suctions the atmosphere into the pump device,
a discharge port that discharges the compressed air of the pump device through the dryer, and
a back pressure introduction port that introduces the air in the air chamber and the air discharged through the dryer, and
the air suspension system comprises;
a first flow passage that communicates the pressure accumulation tank with the air chamber,
a control valve disposed in the first flow passage, and
a second flow passage that communicates a position between the control valve and the pressure accumulation tank with the back pressure introduction port, and that communicates the discharge port with the pressure accumulation tank, and wherein
the control device controls opening and closing the control valve to control the air supplied to and discharged from the air spring device, and controls opening and closing the second flow passage to perform the heat accumulation control.

7. The dryer regeneration method for the air suspension system as recited in claim 6, wherein the air suspension system comprises;
a circulation passage configured by the first flow passage and the second flow passage, to circulate the compressed air by supplying the air discharged through the dryer to the pump device, and
a switching device that opens and closes the circulation passage according to the control performed by the control device.

8. The dryer regeneration method for the air suspension system as recited in claim 7, wherein the switching device comprises a switching valve that opens and closes the circulation passage.

9. The dryer regeneration method for the air suspension system as recited in claim 8, wherein the switching device further comprises;
a three-port two-position changeover valve, which is arranged in parallel with the switching valve, and disposed between the discharge port of the compressor device and the pressure accumulation tank, and which provides a first position that communicates the discharge port of the compressor device with the pressure accumulation tank, and that blocks the communication between the pressure accumulation tank and the first flow passage, and
a second position that communicates the pressure accumulation tank with the first flow passage, and that blocks the communication between the discharge port of the compressor device and the pressure accumulation tank, so that the first position or the second position is selected by the control device.

10. The dryer regeneration method for the air suspension system as recited in claim 7, wherein the switching device comprises;
a three-port three-position changeover valve, which is disposed between the discharge port of the compressor device and the pressure accumulation tank, and which provides a first position that communicates the discharge port of the compressor device with the first flow passage, and that blocks the communication between the discharge port of the compressor device and the pressure accumulation tank,
a second position that communicates the discharge port of the compressor device with the pressure accumulation tank, and that blocks the communication between the pressure accumulation tank and the first flow passage, and
a third position that communicates the pressure accumulation tank with the first flow passage, and that blocks the communication between the discharge port of the compressor device and the pressure accumulation tank,
so that one of the first to third positions is selected by the control device.

11. The dryer regeneration method for the air suspension system as recited in claim 6, wherein the air suspension system comprises;
a first supply-discharge switching valve, which is connected to the first flow passage between the pressure accumulation tank and the control valve, and connected to the discharge port of the compressor device,
a first tank switching valve which is disposed in the second flow passage between the discharge port of the compressor device and the pressure accumulation tank, and
a second supply-discharge switching valve and a second tank switching valve, which are disposed in the first flow passage between the control valve and the pressure accumulation tank, and which are arranged in parallel with the first supply-discharge switching valve and the first tank switching valve, wherein
a position between the second supply-discharge switching valve and the second tank switching valve is connected to the back pressure introduction port of the compressor device, and a position between the first supply-discharge switching valve and the first tank switching valve is connected to the discharge port of the compressor device, and wherein
the control device controls opening and closing the first and second tank switching valves, or opening and closing the first and second supply-discharge switching valves, to perform the heat accumulation control, so that the compressed air discharged from the discharge port through the dryer is introduced into the back pressure introduction port through the second flow passage to be circulated, to accumulate the heat of compression of the compressed air in the dryer.

* * * * *